(12) United States Patent
Nakamura et al.

(10) Patent No.: US 12,311,473 B2
(45) Date of Patent: May 27, 2025

(54) BRAZED ALUMINUM MEMBER AND METHOD FOR PRODUCING BRAZED PRODUCT

(71) Applicant: UACJ Corporation, Tokyo (JP)

(72) Inventors: Shinichi Nakamura, Tokyo (JP); Tomoki Yamayoshi, Tokyo (JP); Taichi Suzuki, Tokyo (JP); Hirokazu Tanaka, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 223 days.

(21) Appl. No.: 17/916,436

(22) PCT Filed: Mar. 26, 2021

(86) PCT No.: PCT/JP2021/012822
§ 371 (c)(1),
(2) Date: Sep. 30, 2022

(87) PCT Pub. No.: WO2021/200639
PCT Pub. Date: Oct. 7, 2021

(65) Prior Publication Data
US 2023/0150069 A1    May 18, 2023

(30) Foreign Application Priority Data

Apr. 2, 2020    (JP) .................. 2020-066894

(51) Int. Cl.
*B23K 35/28*    (2006.01)
*B23K 1/00*    (2006.01)
(Continued)

(52) U.S. Cl.
CPC ........ *B23K 35/0238* (2013.01); *B23K 1/0012* (2013.01); *B23K 1/008* (2013.01);
(Continued)

(58) Field of Classification Search
None
See application file for complete search history.

(56) References Cited

U.S. PATENT DOCUMENTS

2001/0007720 A1    7/2001    Soga et al.

FOREIGN PATENT DOCUMENTS

JP    9-216050 A    8/1997
JP    2004-358519 A    12/2004
(Continued)

OTHER PUBLICATIONS

International Search Report dated Jun. 1, 2021, issued in counterpart International Application No. PCT/JP2021/012822, w/English Translation. (5 pages).

(Continued)

*Primary Examiner* — Daniel J. Schleis
(74) *Attorney, Agent, or Firm* — WHDA, LLP

(57) ABSTRACT

Provided is a brazed aluminum member brazed with a member formed of a brazing sheet, in which two or more grooves are provided on a surface of the brazed aluminum member in a fillet forming area, a groove depth (D1) of the grooves is 0.005 mm to 0.50 mm, a groove width (W1) of the grooves is 0.005 mm to 0.50 mm, a ratio (W1/D1) of the groove width (W1) to the groove depth (D1) is 10.00 or less, and a space (P1) between adjacent grooves is 0.00 mm to 0.30 mm. The present invention can provide an aluminum material and a method for producing a brazed product that can secure good brazing properties even when the clearance between the jointed members is large in the case where the aluminum material is brazed without using a flux.

4 Claims, 8 Drawing Sheets

(51) Int. Cl.
  *B23K 1/008*  (2006.01)
  *B23K 1/19*   (2006.01)
  *B23K 33/00*  (2006.01)
  *B23K 35/02*  (2006.01)
  *C22C 21/02*  (2006.01)
  *C22C 21/06*  (2006.01)
  *B23K 103/10* (2006.01)

(52) U.S. Cl.
  CPC .............. *B23K 1/19* (2013.01); *B23K 33/004* (2013.01); *B23K 35/288* (2013.01); *C22C 21/02* (2013.01); *C22C 21/06* (2013.01); *B23K 2103/10* (2018.08)

(56) References Cited

FOREIGN PATENT DOCUMENTS

| JP | 2013-215797 A | 10/2013 |
| JP | 2014-226704 A | 12/2014 |
| JP | 2015-21159 A  | 2/2015  |
| JP | 2015021159 A * | 2/2015 |
| JP | 2015-58472 A  | 3/2015  |

OTHER PUBLICATIONS

Non-Final Action dated Oct. 24, 2024 issued in U.S. Appl. No. 17/916,357 (10 pages).

\* cited by examiner (A)　　　　　　(B)

Fig.15
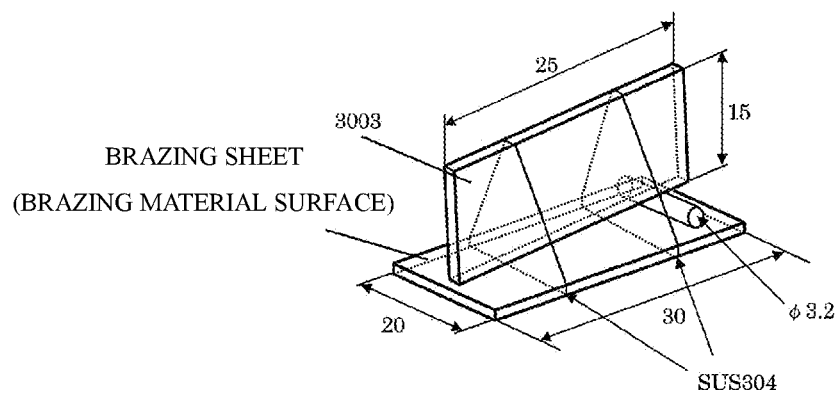
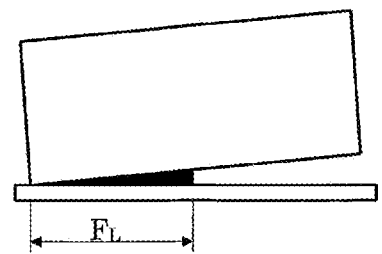

BRAZED ALUMINUM MEMBER AND METHOD FOR PRODUCING BRAZED PRODUCT

TECHNICAL FIELD

The present invention relates to a brazed aluminum member used for brazing an aluminum material without using a flux.

BACKGROUND ART

As a jointing method for products having a lot of small jointed parts such as heat exchangers and machine parts formed of aluminum, brazing joint has been widely used. For performing the brazing joint of aluminum materials (including aluminum alloy materials), it is essential that an oxide film covering a surface is broken and a melted brazing material is in contact with a base material or the same melted brazing material. In order to break the oxide film of the aluminum material, methods are roughly divided into methods of using a flux and methods of heating under vacuum and both methods have been put into practical use.

The brazing joint has a wide variety of application. The most representative example of the product produced by the brazing joint is heat exchangers for automobiles. Almost all of the heat exchangers for automobiles such as radiators, heaters, condensers, and evaporators are formed of aluminum and almost all of them are produced by the brazing joint. Among the methods for the brazing joint, methods of applying a non-corrosive flux to heat in the nitrogen gas are dominant at present.

In the methods of flux brazing, however, the flux and the process of applying the flux are costly and thus these are factors of increasing the cost of the heat exchanger production. A method of producing the heat exchangers by vacuum brazing exists. However, the vacuum brazing method requires expensive facility cost and maintenance cost of heating furnaces and has a problem of productivity and stability of the brazing. Therefore, the need of brazing joint without using the flux in a nitrogen gas furnace has been grown.

In order to satisfy this need, Patent Literature 1 has suggested that surface joint be possible by comprising Mg in the brazing material. Patent Literature 2 has suggested a method of comprising Mg in a core material and diffusing Mg in a brazing material during heating for brazing and has disclosed that oxide film formation on the brazing material surface is prevented at the time of producing a clad material and during the heating for brazing and thus Mg effectively acts for breaking the oxide film on the brazing material surface. Cited Literature 3 has suggested a method of providing grooves on the core material of a brazing sheet and the brazing part of the brazed member to improve brazing properties.

CITATION LIST

Patent Literature

Patent Literature 1: Japanese Patent Publication 2013-215797-A

Patent Literature 2: Japanese Patent Publication 2004-358519-A

Patent Literature 3: Japanese Patent Publication 2014-226704-A

SUMMARY OF INVENTION

Technical Problem

However, in the case of the brazing without using the flux, in the method of comprising Mg in the brazing material or the method of diffusing added Mg into the core material as described in Patent Literatures 1 or 2, a problem in which a large clearance between the members to be jointed as the joint of a header plate and a tube results in insufficient wetting and spreading properties of the brazing material to an edge surface (the core material, an intermediate material, and a sacrifice positive electrode material) of the brazing sheet, the core material surface, and the brazed surface of the brazed member and thus good brazing properties cannot be secured has arisen. In addition, even when the grooves are provided in the brazing part described in Patent Literature 3, a problem in which good brazing properties cannot be secured when the clearance between the jointed members is large has arisen.

Thus, an object of the present invention is to provide an aluminum material and a method for producing a brazed product that can secure good brazing properties even when the clearance between the jointed members is large in the case where the aluminum material is brazed without using the flux.

Solution to Problem

The above problems are solved by the following present invention.

That is, the present invention (1) provides a brazed aluminum member brazed with a member formed of a brazing sheet, the brazing sheet comprising:

a core material formed of an aluminum alloy comprising at least 3.00 mass % or less (including zero) of Mg and formed with the balance being Al and inevitable impurities; and a brazing material formed of an aluminum alloy comprising 3.00 mass % to 13.00 mass % of Si and formed with the balance being Al and inevitable impurities, in which two or more grooves are provided on a surface of the brazed aluminum member in a fillet forming area, a groove depth (D1) of the grooves is 0.005 mm to 0.50 mm, a groove width (W1) of the grooves is 0.005 mm to 0.50 mm, a ratio (W1/D1) of the groove width (W1) to the groove depth (D1) is 10.00 or less, and a space (P1) between the adjacent grooves is 0.00 mm to 0.30 mm.

In addition, the present invention (2) provides a brazed aluminum member brazed with a member formed of a brazing sheet, the brazing sheet comprising:

a core material formed of an aluminum alloy comprising at least 3.00 mass % or less (including zero) of Mg and formed with the balance being Al and inevitable impurities; and a brazing material formed of an aluminum alloy comprising 3.00 mass % to 13.00 mass % of Si and formed with the balance being Al and inevitable impurities, in which a main groove and two or more sub-grooves provided at a groove bottom of the main groove are provided on a surface of the brazed aluminum member in a fillet forming area, a groove depth (D2) of the sub-grooves is 0.005 mm to 0.50 mm, a groove width (W2) of the sub-grooves is 0.005 mm to 0.40 mm, a ratio (W2/D2) of the groove width (W2) of the sub-grooves to the groove depth (D2) of the sub-grooves is 10.00 or less, and a ratio (D2/D3) of the groove depth (D2) of the sub-grooves to a groove depth (D3) of the main groove is 0.50 or more and less than 1.00.

In addition, the present invention (3) provides the brazed aluminum member as described in (1) or (2), in which the aluminum alloy forming the brazed aluminum member comprises any one or more of 1.50 mass % or less of Si, 1.00 mass % or less of Fe, 1.20 mass % or less of Cu, 2.00 mass % or less of Mn, 3.00 mass % or less of Mg, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 1.00 mass % or less of Bi, 0.05 mass % or less of Na, 0.05 mass % or less of Sr, and 0.05 mass % or less of Sb and is formed with the balance being Al and inevitable impurities.

In addition, the present invention (4) provides the brazed aluminum member as described in any one of (1) to (3), in which the brazing material of the brazing sheet further comprises any one or more of 1.00 mass % or less of Bi, 1.00 mass % or less of Fe, 1.20 mass % or less of Cu, 2.00 mass % or less of Mn, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 0.05 mass % or less of Na, 0.05 mass % or less of Sr, and 0.05 mass % or less of Sb.

In addition, the present invention (5) provides the brazed aluminum member as described in any one of (1) to (4), in which the core material of the brazing sheet further comprises any one or more of 1.50 mass % or less of Si, 1.00 mass % or less of Fe, 1.20 mass % or less of Cu, 2.00 mass % or less of Mn, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 1.00 mass % or less of Bi, 0.05 mass % or less of Na, 0.05 mass % or less of Sr, and 0.05 mass % or less of Sb.

In addition, the present invention (6) provides a method for producing a brazed product, the method comprising:

assembling a member formed of a brazing sheet and a brazed aluminum member; and thereafter performing heating for brazing without using a flux, in which a brazing material of the brazing sheet is formed of an aluminum alloy comprising 3.00 mass % to 13.00 mass % of Si and formed with the balance being Al and inevitable impurities, a core material is formed of an aluminum alloy comprising 3.00 mass % or less (including zero) of Mg and formed with the balance being Al and inevitable impurities, two or more grooves are provided on a surface of the brazed aluminum member in a fillet forming area, a groove depth (D1) of the grooves is 0.005 mm to 0.50 mm, a groove width (W1) of the grooves is 0.005 mm to 0.50 mm, a ratio (W1/D1) of the groove width (W1) to the groove depth (D1) is 10.00 or less, and a space (P1) between adjacent grooves is 0.00 mm to 0.30 mm.

In addition, the present invention (7) provides a method for producing a brazed product, the method comprising:

assembling a member formed of a brazing sheet and a brazed aluminum member; and thereafter performing heating for brazing without using a flux, in which a brazing material of the brazing sheet is formed of an aluminum alloy comprising 3.00 mass % to 13.00 mass % of Si and 3.00 mass % or less (including zero) of Mg and formed with the balance being Al and inevitable impurities, a core material is formed of an aluminum alloy comprising 3.00 mass % or less (not including zero) of Mg and formed with the balance being Al and inevitable impurities, a main groove and two or more sub-grooves provided at a groove bottom of the main groove are provided on a surface of the brazed aluminum member in a fillet forming area, a groove depth (D2) of the sub-grooves is 0.005 mm to 0.50 mm, a groove width (W2) of the sub-grooves is 0.005 mm to 0.40 mm, a ratio (W2/D2) of the groove width (W2) of the sub-grooves to the groove depth (D2) of the sub-grooves is 10.00 or less, and a ratio (D2/D3) of the groove depth (D2) of the sub-grooves to a groove depth (D3) of the main groove is 0.50 or more and less than 1.00.

In addition the present invention (8) provides the method for producing a brazed product as described in (6) or (7), in which the brazed aluminum member comprises any one or more of 1.50 mass % or less of Si, 1.00 mass % or less of Fe, 1.20 mass % or less of Cu, 2.00 mass % or less of Mn, 3.00 mass % or less of Mg, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 1.00 mass % or less of Bi, 0.05 mass % or less of Na, 0.05 mass % or less of Sr, and 0.05 mass % or less of Sb and is formed with the balance being Al and inevitable impurities.

In addition, the present invention (9) provides the method for producing a brazed product as described in any one of (6) to (8), in which the brazing material of the brazing sheet formed of the aluminum alloy further comprises any one or more of 1.00 mass % or less of Bi, 1.00 mass % or less of Fe, 1.20 mass % or less of Cu, 2.00 mass % or less of Mn, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 0.05 mass % or less of Na, 0.05 mass % or less of Sr, and 0.05 mass % or less of Sb.

In addition, the present invention (10) provides the method for producing a brazed product as described in any one of (6) to (9), in which the core material of the brazing sheet formed of the aluminum alloy further comprises any one or more of 1.50 mass % or less of Si, 1.00 mass % or less of Fe, 1.20 mass % or less of Cu, 2.00 mass % or less of Mn, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 1.00 mass % or less of Bi, 0.05 mass % or less of Na, 0.05 mass % or less of Sr, and 0.05 mass % or less of Sb.

Advantageous Effect of Invention

The present invention can provide an aluminum material and a method for producing a brazed product that can secure good brazing properties even when the clearance between the jointed members is large in the case where the aluminum material is brazed without using the flux.

BRIEF DESCRIPTION OF DRAWING

FIG. 15 includes views illustrating a test body used for a clearance filling test in Examples.

DESCRIPTION OF EMBODIMENTS

Figure 1:
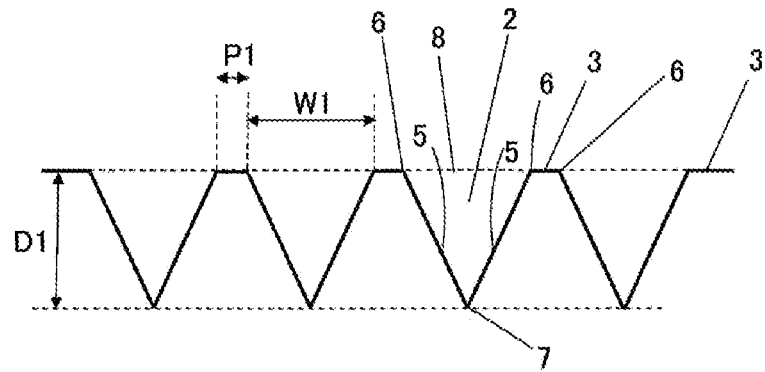
FIG. 1 is a schematic cross-sectional view illustrating a form example of grooves formed in a brazed member.

The brazes aluminum member of the first embodiment of the present invention is a brazed aluminum member brazed with a member formed of a brazing sheet, the brazing sheet comprising:

a core material formed of an aluminum alloy comprising at least 3.00 mass % or less (including zero) of Mg and formed with the balance being Al and inevitable impurities; and a brazing material formed of an aluminum alloy comprising 3.00 mass % to 13.00 mass % of Si and formed with the balance being Al and inevitable impurities, in which two or more grooves are provided on a surface of the brazed aluminum member in a fillet forming area, a groove depth (D1) of the grooves is 0.005 mm to 0.50 mm, a groove width (W1) of the grooves is 0.005 mm to 0.50 mm, a ratio (W1/D1) of the groove width (W1) to the groove depth (D1) is 10.00 or less, and a space (P1) between adjacent grooves is 0.00 mm to 0.30 mm.

The brazes aluminum member of the second embodiment of the present invention is a brazed aluminum member brazed with a member formed of a brazing sheet, the brazing sheet comprising:

a core material formed of an aluminum alloy comprising at least 3.00 mass % or less (including zero) of Mg and formed with the balance being Al and inevitable impurities; and a brazing material formed of an aluminum alloy comprising 3.00 mass % to 13.00 mass % of Si and formed with the balance being Al and inevitable impurities, in which a main groove and two or more sub-grooves provided at a groove bottom of the main groove are provided on a surface of the brazed aluminum member in a fillet forming area, a groove depth (D2) of the sub-grooves is 0.005 mm to 0.50 mm, a groove width (W2) of the sub-grooves is 0.005 mm to 0.40 mm, a ratio (W2/D2) of the groove width (W2) of the sub-grooves to the groove depth (D2) of the sub-grooves is 10.00 or less, and a ratio (D2/D3) of the groove depth (D2) of the sub-grooves to a groove depth (D3) of the main groove is 0.50 or more and less than 1.00.

Although the brazed aluminum member of the first embodiment of the present invention (hereinafter, also referred to as a brazed aluminum member (1)) and the brazed aluminum member of the second embodiment of the present invention (hereinafter, also referred to as a brazed aluminum member (2)) have different shapes of the grooves provided on the surface of the brazed aluminum member in the fillet formation area, the composition and the shapes of members have similar points. Therefore, the similar points will be explained by describing as the brazed aluminum member (1 or 2).

The brazed aluminum member (1 or 2) is a formed product of pure aluminum or an aluminum alloy, is an aluminum member brazed with a member formed of a brazing sheet formed of an aluminum alloy in brazing without using a flux, and has no brazing material. Hereinafter, the aluminum material (a pure aluminum material or an aluminum alloy material) formed into the brazed aluminum member (1 or 2) will be described as the pure aluminum for the brazed member (1 or 2) or the aluminum alloy for the brazed member (1 or 2). These are collectively described as the aluminum material for the brazed member (1 or 2).

The brazed aluminum member (1 or 2) is not particularly limited as long as the brazed aluminum member is used as a counterpart material brazed with a member formed of the brazing sheet by heating for brazing. Examples of the brazed aluminum member include: formed products in which the sheet-like aluminum material for the brazed member (1 or 2) is formed into a shape such as a tube, a fin, a header, a tank, and a cap; extruded pipes and extruded multi-hole pipes produced by extrusion forming of the aluminum material for the brazed member (1 or 2); and electric welded pipes formed by bending drawn materials or streaky sheet materials so that the side edge surfaces are faced with each other, performing high frequency welding of the side edge surfaces, and deforming the welded product into a flat shape.

The composition of the aluminum alloy for the brazed member (1 or 2) is not particularly limited as long as the composition is used for the counterpart material brazed with the member formed of the brazing sheet by heating for brazing.

As the aluminum alloy for the brazed member (1 or 2), an aluminum alloy comprising any one or more of 1.50 mass % or less of Si, 1.00 mass % or less of Fe, 1.20 mass % or less of Cu, 2.00 mass % or less of Mn, 3.00 mass % or less of Mg, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 1.00 mass % or less of Bi, 0.05 mass % or less of Na, 0.05 mass % or less of Sr, and 0.05 mass % or less of Sb and formed with the balance being Al and inevitable impurities is included.

The aluminum alloy for the brazed member (1 or 2) may comprise Si. Si forms Al—Mn—Si-based, Al—Fe—Si-based, and Al—Fe—Mn—Si-based intermetallic compounds together with Fe and Mn, acts as distribution enhancement, or improves material strength due to solid solution strengthening by causing solid solution in a matrix. Si also exhibits an effect of improving strength due to aging precipitation of a $Mg_2Si$ compound by reacting with Mg. In the case where the aluminum alloy for the brazed member (1 or 2) comprises Si, a Si content in the aluminum alloy for the brazed member (1 or 2) is 1.50 mass % or less, preferably 0.05 mass % to 1.50 mass %, and particularly preferably 0.20 mass % to 1.00 mass %. An aluminum alloy having a Si content of more than the above range causes the solidus temperature (melting point) of the brazed member to decrease and thus may have higher risk of melting the brazed member at the time of brazing.

The aluminum alloy for the brazed member (1 or 2) may comprise Fe. Fe forms Al—Fe—Mn-based, Al—Fe—Si-based, and Al—Fe—Mn—Si-based intermetallic compounds together with Mn and Si, acts as distribution enhancement, or improves material strength. In the case where the aluminum alloy for the brazed member (1 or 2) comprises Fe, a Fe content in the aluminum alloy for the brazed member (1 or 2) is 1.00 mass % or less, preferably 0.05 mass % to 1.00 mass %, and particularly preferably 0.05 mass % to 0.70 mass %. An aluminum alloy having a Fe content of more than the above range causes giant intermetallic compounds to be easily formed at the time of casting and thus plastic workability deteriorates.

The aluminum alloy for the brazed member (1 or 2) may comprise Cu. Cu improves the material strength due to solid solution strengthening. In the case where the aluminum alloy for the brazed member (1 or 2) comprises Cu, a Cu content in the aluminum alloy for the brazed member (1 or 2) is 1.20 mass % or less and preferably 0.05 mass % to 0.80 mass %. An aluminum alloy having a Cu content of more than the above range causes the solidus temperature (melting point) of the brazed member to decrease and thus may increase the risk of melting the brazed member at the time of brazing.

The aluminum alloy for the brazed member (1 or 2) may comprise Mn. Mn forms Al—Fe—Mn-based, Al—Mn—Si-based, and Al—Fe—Mn—Si-based intermetallic compounds together with Fe and Si, acts as distribution enhancement, or improves material strength due to solid solution strengthening by causing solid solution in a matrix. In the case where the aluminum alloy for the brazed member (1 or 2) comprises Mn, a Mn content in the aluminum alloy for the brazed member (1 or 2) is 2.00 mass % or less and preferably 0.60 mass % to 1.50 mass %. An aluminum alloy having a Mn content of more than the above range causes giant intermetallic compounds to be easily formed at the time of casting and thus plastic workability deteriorates.

The aluminum alloy for the brazed member (1 or 2) may comprise Mg. Mg breaks the oxide film of aluminum covering the surface of the brazed member during heating for brazing and improves wettability between the brazing material supplied from the brazing sheet and the surface of the brazed member. In the case where the aluminum alloy for the brazed member (1 or 2) comprises Mg, a Mg content in the aluminum alloy for the brazed member (1 or 2) is 3.00 mass % or less, preferably 0.02 mass % to 1.50 mass %, and particularly preferably 0.50 mass % to 1.20 mass %. On the other hand, an aluminum alloy having a Mg content of less than the above range results in an insufficient effect of breaking the oxide film of the brazed member, whereas an aluminum alloy having a Mg content of more than the above range causes the brazing properties to deteriorate due to formation of MgO on the surface of the brazing member.

The aluminum alloy for the brazed member (1 or 2) may comprise Zn. Zn allows the oxide film of aluminum covering the brazed member to embrittle, at the same time, break of the oxide film of the brazed member to be secured due to a synergy effect of comprised Bi and Mg, and wettability between the brazing material supplied from the brazing sheet and the surface of the brazed member to be improved. In addition, Zn sets the natural potential less-noble to exhibit a sacrificial protection effect. In the case where the aluminum alloy for the brazed member (1 or 2) comprises Zn, a Zn content in the aluminum alloy for the brazed member (1 or 2) is 8.00 mass % or less, preferably 0.50 mass % to 5.00 mass %, and particularly preferably 1.50 mass % to 3.50 mass %. On the other hand, an aluminum alloy having a Zn content of less than the above range results in the insufficient effect of embrittling the oxide film of the brazed member, whereas an aluminum alloy having a Zn content of more than the above range causes the solidus temperature (melting point) of the brazed member to decrease and thus may have higher risk of melting the brazed member at the time of brazing.

The aluminum alloy for the brazed member (1 or 2) may comprise any one or more of Cr, Ti, and Zr. Cr, Ti, and Zr improve strength due to solid solution strengthening. In the case where the aluminum alloy for the brazed member (1 or 2) comprises Cr, a Cr content in the aluminum alloy for the brazed member (1 or 2) is 0.30 mass % or less and preferably 0.10 mass % to 0.20 mass %. In the case where the aluminum alloy for the brazed member (1 or 2) comprises Ti, a Ti content in the aluminum alloy for the brazed member (1 or 2) is 0.30 mass % or less and preferably 0.10 mass % to 0.20 mass %. In the case where the aluminum alloy for the brazed member (1 or 2) comprises Zr, a Zr content in the aluminum alloy for the brazed member (1 or 2) is 0.30 mass % or less and preferably 0.10 mass % to 0.20 mass %. An aluminum alloy having a Cr, Ti, or Zr content of more than the above range causes giant intermetallic compounds to be easily formed at the time of casting and thus plastic workability deteriorates.

The aluminum alloy for the brazed member (1 or 2) may comprise either one or two of In and Sn. In and Sn set the natural potential less-noble to exhibit a sacrificial protection effect. In the case where the aluminum alloy for the brazed member (1 or 2) comprises In, an In content in the aluminum alloy for the brazed member (1 or 2) is 0.10 mass % or less, preferably 0.005 mass % to 0.10 mass %, and particularly preferably 0.01 mass % to 0.05 mass %. In the case where the aluminum alloy for the brazed member (1 or 2) comprises Sn, a Sn content in the aluminum alloy for the brazed member (1 or 2) is 0.10 mass % or less, preferably 0.005 mass % to 0.10 mass %, and particularly preferably 0.01 mass % to 0.05 mass %. An aluminum alloy having an In or Sn content of more than the above range generates local melting during hot rolling and thus the production is difficult.

The aluminum alloy for the brazed member (1 or 2) may comprise Bi. Bi reduces surface tension of the brazed member by melting the surface part of the brazed member during heating for brazing due to the brazing material supplied from the brazing sheet to improve wettability between the brazing material supplied from the brazing sheet and the surface of the brazed member. In the case where the aluminum alloy for the brazed member (1 or 2) comprises Bi, a Bi content in the aluminum alloy for the brazed member (1 or 2) is 1.00 mass % or less and preferably 0.05 mass % to 0.30 mass %. On the other hand, an aluminum alloy having a Bi content of less than the above range results in the insufficient effect of reducing the surface tension of the brazed member, whereas an aluminum alloy having a Bi content of more than the above range causes cracks to be generated at the time of hot rolling, resulting in difficulty in production.

The aluminum alloy for the brazed member (1 or 2) may comprise any one or more of Na, Sr, and Sb. Na, Sr, and Sb dissolve into the fillet formed during brazing and cause the Si particles in the fillet to be finer. In the case where the aluminum alloy for the brazed member (1 or 2) comprises Na, a Na content in the aluminum alloy for the brazed member (1 or 2) is 0.05 mass % or less, preferably 0.003 mass % to 0.05 mass %, and particularly preferably 0.005 mass % to 0.03 mass %. In the case where the aluminum alloy for the brazed member (1 or 2) comprises Sr, a Sr content in the aluminum alloy for the brazed member (1 or 2) is 0.05 mass % or less, preferably 0.003 mass % to 0.05 mass %, and particularly preferably 0.005 mass % to 0.03 mass %. In the case where the aluminum alloy for the brazed member (1 or 2) comprises Sb, an Sb content in the aluminum alloy for the brazed member (1 or 2) is 0.05 mass % or less, preferably 0.003 mass % to 0.05 mass %, and particularly preferably 0.005 mass % to 0.03 mass %.

The brazed aluminum member (1 or 2) may be formed of a single aluminum alloy for the brazing member (1 or 2) or may be formed of an aluminum alloy for the brazing member (1 or 2) having one or more layers of aluminum alloy layers on the surface. Examples of the aluminum alloy layers include sacrificial positive electrode layers, cladding material layers, intermediate layers, and brazing sacrificial layers. The sacrificial positive material layers are aluminum alloy layers that mainly comprise Zn and other elements and have the function of preventing corrosion due to a sacrificial positive electrode effect. Examples of the cladding layers include aluminum alloy layers that mainly comprise Si, melt during heating for brazing, and function as the brazing material. Examples of the intermediate layers include clad layers that have the function of sacrificial positive electrode materials to which Zn is added, the function of improving strength with adding Mn, and the function of promoting oxide film break with adding Mg and diffusing Mg into the surface layer during heating for brazing. The compositions of the aluminum alloy layers are appropriately selected depending on the function. Examples of the brazed aluminum member (1 or 2) formed of the single aluminum alloy for the brazed member (1 or 2) include extrusion processed materials, such as extruded pipes and extruded multi-hole pipes, produced by extruding the single aluminum alloy and sheet-like bare materials produced by rolling the single aluminum alloy into a sheet-like form. Examples of the brazed aluminum member (1 or 2) formed of the aluminum alloy for the brazing member (1 or 2) having one or more layers of the aluminum alloy layers on the surface include: a brazed member formed of a cladding material in which one or more layers of the aluminum alloy layers are clad on one side surface or both side surfaces of a core material formed of the sheet-like aluminum alloy for brazing member (1 or 2); and a brazed member in which one or more layers of the aluminum alloy layers are thermally sprayed on the surface of the extruded pipe or extruded multi-hole pipe formed of the aluminum alloy for the brazing member (1 or 2).

The member formed of the brazing sheet according to the brazed aluminum member (1) and the member formed of the brazing sheet according to the brazed aluminum member (2) are the same. Hereinafter, the member formed of the brazing sheet according to the brazed aluminum member (1) and the member formed of the brazing sheet according to the brazed aluminum member (2) will be collectively described as the member formed of the brazing sheet according to the present invention and will be explained. The brazing sheet forming a member formed of the brazing sheet according to the present invention will be also described as the brazing sheet according to the present invention.

The member formed of the brazing sheet according to the present invention is a formed product of the brazing sheet according to the present invention and is a member formed of the brazed aluminum member (1 or 2) and the brazing sheet formed of the aluminum alloy to be brazed in the brazing without the flux.

Examples of the member formed of the brazing sheet according to the present invention include: formed products in which the brazing sheet according to the present invention is formed into shapes such as a tube, a fin, a header, and a tank; extruded pipes and extruded multi-hole pipes produced by extrusion forming of the aluminum material for the brazed member; and electric welded pipes formed by bending drawn materials or streaky sheet materials so that the side edge surfaces are faced with each other, performing high frequency welding of the side edge surfaces, and deforming the welded product into a flat shape.

The brazing sheet according to the present invention comprises at least the core material and the brazing material. Examples of the brazing sheet according to the present invention include a two-layer clad material arranging the brazing material on one side surface of the core material, a three-layer clad material arranging the brazing material on both side surfaces of the core material, a multi-layer clad material arranging one or more aluminum alloy layers and brazing materials on one side surface of the core material, a multi-layer clad material arranging one or more aluminum alloy layers or brazing materials on both side surfaces of the core material.

The core material of the brazing sheet according to the present invention comprises any one of 1000 series, 2000 series, 3000 series, 4000 series, 5000 series, 6000 series, 7000 series, and 8000 series-based alloy comprising 3.00 mass % or less (including zero) of Mg and preferably comprises any one of 1000 series, 3000 series, 5000 series, 6000 series, and 7000 series-based alloy comprising 3.00 mass % or less (including zero) of Mg. The aluminum alloy that constitutes the core material of the brazing sheets according to the present invention is existing alloys having a solidus temperature of 600° C. or more and may be any of 1000 series, 2000 series, 3000 series, 4000 series, 5000 series, 6000 series, 7000 series, and 8000 series and preferably 1000 series, 3000 series, 5000 series, 6000 series, and 7000 series. These alloys may comprise 3.00 mass % or less (including zero) of Mg.

The core material of the brazing sheet according to the present invention comprises Mg. Mg comprised in the core material improves material strength due to solid solution strengthening by causing solid solution in a matrix. Mg comprised in the core material also exhibits an effect of improving strength due to aging precipitation of a $Mg_2Si$ compound by reacting with Si and at the same time diffuses into the brazing material at the time of heating for brazing to break the oxide film of aluminum covering the surface of the brazing material due to lower oxide generation free energy than that of aluminum. A Mg content in the core material is 3.00 mass % or less (including zero), preferably 0.02 mass % to 1.50 mass %, and particularly preferably 0.50 mass % to 1.20 mass %. A core material having a Mg content of more than the above range causes the solidus temperature (melting point) of the brazed member to decrease and thus may increase the risk of melting the brazed member at the time of brazing.

The core material of the brazing sheet according to the present invention may further comprise any one or more of 1.50 mass % or less of Si, 1.00 mass % or less of Fe, 1.20 mass % or less of Cu, 2.00 mass % or less of Mn, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 1.00 mass % or less of Bi, 0.05 mass % or less of Na, 0.05 mass % or less of Sr, and 0.05 mass % or less of Sb.

The core material of the brazing sheet according to the present invention may comprise Si. Si forms Al—Mn—Si-based, Al—Fe—Si-based, and Al—Fe—Mn—Si-based intermetallic compounds together with Fe and Mn, acts as distribution enhancement, or improves material strength due to solid solution strengthening by causing solid solution in a matrix. Si also exhibits an effect of improving strength due to aging precipitation of a $Mg_2Si$ compound by reacting with Mg. In the case where the core material of the brazing sheet according to the present invention comprises Si, a Si content in the core material is 1.50 mass % or less, preferably 0.05 mass % to 1.50 mass %, and especially preferably 0.20 mass % to 1.00 mass %. An aluminum alloy having a Si content of more than the above range causes the solidus temperature (melting point) of the brazed member to decrease and thus may have higher risk of melting the brazed member at the time of brazing.

The core material of the brazing sheet according to the present invention may comprise Fe. Fe forms Al—Fe—Mn-based, Al—Fe—Si-based, and Al—Fe—Mn—Si-based intermetallic compounds together with Mn and Si, acts as distribution enhancement, or improves material strength. In the case where the core material of the brazing sheet according to the present invention comprises Fe, a Fe content in the core material is 1.00 mass % or less, preferably 0.05 mass % to 1.00 mass %, and particularly preferably 0.05 mass % to 0.70 mass %. An aluminum alloy having a Fe content of more than the above range causes giant intermetallic compounds to be easily formed at the time of casting and thus plastic workability deteriorates.

The core material of the brazing sheet according to the present invention may comprise Cu. Cu improves the material strength due to solid solution strengthening. In the case where the core material of the brazing sheet according to the present invention comprises Cu, a Cu content in the core material is 1.20 mass % or less and preferably 0.05 mass % to 0.80 mass %. An aluminum alloy having a Cu content of more than the above range causes the solidus temperature (melting point) of the brazed member to decrease and thus may increase the risk of melting the brazed member at the time of brazing.

The core material of the brazing sheet according to the present invention may comprise Mn. Mn forms Al—Fe—Mn-based, Al—Mn—Si-based, and Al—Fe—Mn—Si-based intermetallic compounds together with Fe and Si, acts as distribution enhancement, or improves material strength due to solid solution strengthening by causing solid solution in a matrix. In the case where the core material of the brazing sheet according to the present invention comprises Mn, a Mn content in the core material is 2.00 mass % or less and preferably 0.60 mass % to 1.50 mass %. An aluminum alloy having a Mn content of more than the above range causes giant intermetallic compounds to be easily formed at the time of casting and thus plastic workability deteriorates.

The core material of the brazing sheet according to the present invention may comprise Zn. In the case where the core material is not covered with the brazing material or the alloy layer, Zn allows the oxide film of aluminum covering the surface of the core material to embrittle, at the same time, break of the oxide film of the core material to be secured due to a synergy effect of comprised Bi and Mg, and wettability between the brazing material supplied from the brazing sheet and the surface of the core material to be improved. In addition, Zn sets the natural potential less-noble to exhibit a sacrificial protection effect. In the case where the core material of the brazing sheet according to the present invention comprises Zn, a Zn content in the core material is 8.00 mass % or less, preferably 0.50 mass % to 5.00 mass %, and particularly preferably 1.50 mass % to 3.50 mass %. A core material having a Zn content of more than the above range causes the solidus temperature (melting point) of the core material to decrease and thus may increase the risk of melting the core material at the time of brazing.

The core material of the brazing sheet according to the present invention may comprise any one or more of Cr, Ti, and Zr. Cr, Ti, and Zr improve strength due to solid solution strengthening. In the case where the core material of the brazing sheet according to the present invention comprises Cr, a Cr content in the core material is 0.30 mass % or less and preferably 0.10 mass % to 0.20 mass %. In the case where the core material of the brazing sheet according to the present invention comprises Ti, a Ti content in the core material is 0.30 mass % or less and preferably 0.10 mass % to 0.20 mass %. In the case where the core material of the brazing sheet according to the present invention comprises Zr, a Zr content in the core material is 0.30 mass % or less and preferably 0.10 mass % to 0.20 mass %. A core material having Cr, Ti, and Zr contents of more than the above range causes giant intermetallic compounds to be easily formed at the time of casting and thus plastic workability deteriorates.

The core material of the brazing sheet according to the present invention may comprise either one or two of In and Sn. In and Sn set the natural potential less-noble to exhibit a sacrificial protection effect. In the case where the core material of the brazing sheet according to the present invention comprises In, an In content in the core material is 0.10 mass % or less, preferably 0.005 mass % to 0.10 mass %, and particularly preferably 0.01 mass % to 0.05 mass %. In the case where the core material of the brazing sheet according to the present invention comprises Sn, a Sn content in the core material is 0.10 mass % or less, preferably 0.005 mass % to 0.10 mass %, and particularly preferably 0.01 mass % to 0.05 mass %. A core material having In and Sn contents of more than the above range generates local melting during hot rolling and thus the production is difficult.

The core material of the brazing sheet according to the present invention may comprise Bi. Bi reduces the surface tension of the melted brazing substance by supplying Bi to the brazing material by melting the core material during heating for brazing to improve the brazing properties. In the case where the core material of the brazing sheet according to the present invention comprise Bi, a Bi content in the core material is 1.00 mass % or less and preferably 0.05 mass % to 0.30 mass %. A core material having a Bi content of more than the above range generates cracks during hot rolling and thus the production is difficult.

The core material of the brazing sheet according to the present invention may comprise any one or more of Na, Sr, and Sb. Na, Sr, and Sb allow finer Si particles to be formed at the time of solidifying a brazing substance by supplying Na, Sr, and Sb to the brazing material caused by melting the core material during heating for brazing. In the case where the core material of the brazing sheet comprises Na, a Na content in the core material is 0.05 mass % or less, preferably 0.003 mass % to 0.05 mass %, and particularly preferably 0.005 to 0.03 mass %. In the case where the core material of the brazing sheet comprises Sr, a Sr content in the core material is 0.05 mass % or less, preferably 0.003 mass % to 0.05 mass %, and particularly preferably 0.005 to 0.03 mass %. In the case where the core material of the brazing sheet comprises Sb, an Sb content in the core material is 0.05 mass % or less, preferably 0.003 mass % to 0.05 mass %, and particularly preferably 0.005 to 0.03 mass %.

The brazing material of the brazing sheet according to the present invention is formed of an aluminum alloy comprising 3.00 mass % to 13.00 mass % of Si and formed with the balance being Al and inevitable impurities.

A Si content in the brazing material of the brazing sheet according to the present invention is 3.00 mass % to 13.00 mass %. A brazing material having a Si content of less than the above range causes the brazing properties to be insufficient, whereas a brazing material having a Si content of more than the above range causes coarse primary Si grains to be easily formed at the time of casting and cracks to be easily generated at the time of material production and thus plastic workability deteriorates.

The brazing material of the brazing sheet according to the present invention may further comprise any one or more of 1.00 mass % or less of Bi, 1.00 mass % or less of Fe, 1.20 mass % or less of Cu, 2.00 mass % or less of Mn, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 0.05 mass % or less of Na, 0.05 mass % or less of Sr, and 0.05 mass % or less of Sb.

The brazing material of the brazing sheet according to the present invention may further comprise Bi. Bi comprised in the brazing material promotes the break of the oxide film by Mg supplied from the core material to the brazing material at the time of heating for brazing and thus the brazing properties are improved. In the case where the brazing material of the brazing sheet according to the present invention comprises Bi, a Bi content in the brazing material is 1.00 mass % or less and preferably 0.004 mass % to 0.50 mass %. A brazing material having a Bi content of more than the above range generates cracks at the time of hot rolling and thus the production is difficult.

The brazing material of the brazing sheet according to the present invention may further comprise 1.00 mass % or less and preferably 0.05 mass % to 0.50 mass % of Fe.

The brazing material of the brazing sheet according to the present invention may further comprise either one or two of Zn and Cu. Zn and Cu in the brazing material decrease the melting point of the brazing material and enable brazing at a temperature lower than 600° C., which is the typical brazing temperature. In the case where the brazing material of the brazing sheet according to the present invention comprises Zn, a Zn content in the brazing material is 8.00 mass % or less, preferably 0.50 mass % to 8.00 mass %, and particularly preferably 2.00 mass % to 4.00 mass %. In the case where the brazing material of the brazing sheet according to the present invention comprises Cu, a Cu content in the brazing material is 4.00 mass % or less and preferably 1.00 mass % to 3.00 mass %.

The brazing material of the brazing sheet according to the present invention may further comprise any one or more of Mn, Cr, Ti, and Zr. Mn, Cr, Ti, and Zr in the brazing material improve corrosion resistance by coarsening the crystal grain size of the brazing material after brazing and suppressing grain drop of the brazing material under a corrosive environment. In the case where the brazing material of the brazing sheet according to the present invention comprises Mn, a Mn content in the brazing material is 2.00 mass % or less and preferably 0.10 mass % to 0.60 mass %. In the case where the brazing material of the brazing sheet according to the present invention comprises Cr, a Cr content in the brazing material is 0.30 mass % or less and preferably 0.05 mass % to 0.10 mass %. In the case where the brazing material of the brazing sheet according to the present invention comprises Ti, a Ti content in the brazing material is 0.30 mass % or less and preferably 0.05 mass % to 0.10 mass %. In the case where the brazing material of the brazing sheet according to the present invention comprises Zr, a Zr content in the brazing material is 0.30 mass % or less and preferably 0.05 mass % to 0.10 mass %. A brazing material having a Mn, Cr, Ti, or Zr content of more than the above range causes giant intermetallic compounds to be easily formed at the time of casting and thus plastic workability deteriorates.

The brazing material brazing sheet according to the present invention may further comprise either one or two of In and Sn. In and Sn in the brazing material set the natural potential less-noble to exhibit a sacrificial protection effect. In the case where the brazing material of the brazing sheet according to the present invention comprises In, an In content in the brazing material is 0.10 mass % or less, preferably 0.005 mass % to 0.10 mass %, and particularly preferably 0.01 mass % to 0.05 mass %. In the case where the brazing material of the brazing sheet according to the present invention comprises Sn, a Sn content in the brazing material is 0.10 mass % or less, preferably 0.005 mass % to 0.10 mass %, and particularly preferably 0.01 mass % to 0.05 mass %.

The brazing material of the brazing sheet according to the present invention may comprise any one or more of Na, Sr, and Sb. Na, Sr or Sb is added to the brazing material for forming finer Si particles. In the case where the brazing material of the brazing sheet comprises Na, a Na content in the brazing material is 0.05 mass % or less, preferably 0.003 mass % to 0.05 mass %, and particularly preferably 0.005 mass % to 0.03 mass %. In the case where the core material of the brazing sheet comprises Sr, a Sr content in the brazing material is 0.05 mass % or less, preferably 0.003 mass % to 0.05 mass %, and particularly preferably 0.005 mass % to 0.03 mass %. In the case where the core material of the brazing sheet comprises Sb, an Sb content in the brazing material is 0.05 mass % or less, preferably 0.003 mass % to 0.05 mass %, and particularly preferably 0.005 to 0.03 mass %.

The grooves (two or more grooves) formed on the surface of the brazed aluminum member (1) and the grooves (a main groove having two or more sub-grooves at the bottom of the groove) formed on the surface of the brazed aluminum member (2) are different and thus each of them will be described separately.

In the brazed aluminum member (1), two or more grooves are provided on the surface of the brazed aluminum member (1) in the fillet forming area, in which the groove depth (D1) is 0.005 mm to 0.50 mm, the groove width (W1) is 0.005 mm to 0.50 mm, the ratio (W1/D1) of the groove width (W) to the groove depth (D1) is 10.00 or less, and the space (P1) between adjacent grooves is 0.00 mm to 0.30 mm. Providing such grooves in the fillet formation area of the joint allows the braze substance to flow along the grooves after the braze substance is flowed into the grooves due to capillary action, fillets to be formed continuously without forming discontinuous parts, and a sound brazed joint without fillet deficiency to be formed.

Two or more grooves are provided on the surface of the brazed aluminum member (1). The number of the grooves provided on the surface of the brazed aluminum member (1) in the fillet forming area is two or more, preferably four or more, and particularly preferably eight or more. A brazed aluminum member (1) having a number of the grooves provided on the surface in the fillet formation area of less than the above range results in an insufficient amount of braze substance flowing along the grooves and thus a sound brazed joint is not formed.

The groove depth (D1) of the grooves on the surface of the brazed aluminum member (1) is 0.005 mm to 0.50 mm, preferably 0.005 mm to 0.30 mm, and particularly preferably 0.005 mm to 0.10 mm for any grooves. A brazed aluminum member (1) having a groove depth (D1) within the above range allows good brazing properties to be secured because the wetting and spreading properties of the brazing material to the brazed member are improved during heating for brazing. On the other hand, a brazed aluminum member (1) having a groove depth (D1) of less than the above range results in insufficient action of the capillary action and thus a sound brazed joint cannot be formed, whereas a brazed aluminum member (1) having a groove depth (D1) of more than the above range results in the insufficient amount of the braze substance due to the consumption of the melted braze substance for filling the grooves and thus good brazing properties cannot be secured.

The groove width (W1) of the grooves provided on the surface of the brazed aluminum member (1) is 0.005 mm to 0.50 mm, preferably 0.005 mm to 0.40 mm, and particularly preferably 0.005 mm to 0.30 mm for any grooves. A brazed aluminum member (1) having a groove width (W1) within the above range allows good brazing properties to be secured because the wetting and spreading properties of the brazing material to the brazed member are improved during heating for brazing. On the other hand, a brazed aluminum member (1) having a groove width (W1) of less than the above range results in narrow flow paths for the melted brazing material and thus a sound brazed joint cannot be formed and thus good brazing properties cannot be secured, whereas a brazed aluminum member (1) having a groove width (W1) of more than the above range results in the insufficient amount of the brazing material due to the consumption of the melted brazing material for filling the grooves and thus good brazing properties cannot be secured.

In the brazed aluminum member (1), the ratio (W1/D1) of the groove width (W) to the groove depth (D1) is 10.00 or less, preferably 0.20 to 5.00, and particularly preferably 0.50 to 5.00 for any grooves. A brazed aluminum member (1) having a ratio W1/D1 within the above range allows good brazing properties to be secured because the wetting and spreading properties of the brazing material to the brazed member are improved during heating for brazing. On the other hand, a brazed aluminum member (1) having a ratio W1/D1 of more than the above range results in insufficient action of the capillary action and thus a sound brazed joint is not formed.

In the brazed aluminum member (1), the space (P1) between adjacent grooves is 0.00 mm to 0.30 mm, preferably 0.00 mm to 0.20 mm, and particularly preferably 0.00 mm to 0.10 mm. A brazed aluminum member (1) having a space between the adjacent grooves (P1) within the above range allows good brazing properties to be secured because the wetting and spreading properties of the brazing material to the brazed member are improved during heating for brazing. On the other hand, a brazed aluminum member (1) having a space between the adjacent grooves (P1) of more than the above range causes the brazing material between the grooves not to be contacted with each other, and thus the fillet is segmentalized and a sound brazed joint is not formed.

In the brazed aluminum member (1), the groove depth (D1) of the groove refers to the distance between the deepest part of the groove and the extension line of the non-formed part of the groove in the cross-section cut in a direction (width direction) perpendicular to a groove extension direction. The groove width (W1) of the groove refers to the distance between the highest parts of the groove surfaces on both sides of the groove in the cross-section cut in the direction (width direction) perpendicular to the groove extension direction. The space (P1) between the adjacent grooves refers to the distance between the highest part of the groove surface of one groove and the highest part of the groove surface of the adjacent groove in the cross-section cut in the direction (width direction) perpendicular to the groove extension direction.

In the brazed aluminum member (1), examples of the cross-sectional shape when the groove is cut in the width direction include an approximate triangle and an approximate quadrangle and examples of the shape of the groove surfaces include an approximate V-shape. In the brazed aluminum member (1), the non-formed part of the grooves may exist between the adjacent grooves or the non-formed part of the grooves may not exist between the adjacent grooves. In the aluminum brazed member (1), the position of the highest part of the groove surface of the groove may have the same height as the position of the extension line of the non-formed parts of the grooves or the position of the highest part of the groove surface of the groove may be higher than the position of the extension line of the non-formed parts of the grooves. In the brazed aluminum member (1), the highest part of the groove surface of one groove and the highest part of the groove surface of the adjacent groove may overlap at the position of the extension line of the non-formed parts of the grooves. In the brazed aluminum member (1), a raised part where the position of the highest part is higher than the position of the extension line of the non-formed parts of the grooves may be formed at the upper part of the groove surface of the groove.

The grooves formed in the brazed aluminum member (1) will be described in detail with reference to FIG. 1 to FIG. 5. FIG. 1 to FIG. 5 are schematic cross-sectional views illustrating the form examples of the grooves formed in the brazed aluminum member (1). In FIG. 1, the groove depth (D1) of a groove 2 refers to the distance between a deepest part 7 of the groove 2 and an extension line 8 of a non-formed parts 3 of the grooves. The groove width (W1) of the groove 2 refers to the distance between highest parts 6 of groove surfaces 5 on both sides of the groove 2 in the width direction. The space (P1) between the adjacent grooves refers to the distance between the highest part 6 of the groove surface 5 of one groove 2 and the highest part 6 of the groove surface 5 of the adjacent groove 2.

In the form example illustrated in FIG. 1, the cross-sectional shape at the time of cutting the groove 2 in the width direction is an approximate triangle and the shape of the groove surfaces 5 of groove 2 is an approximate V-shape. In the form example illustrated in FIG. 1, the non-formed parts 3 of grooves between adjacent grooves exist. In the form example illustrated in FIG. 1, the highest part 6 of the groove surface 5 of groove 2 has the same height as the position of the extension line 8 of the non-formed parts 3 of the grooves. In the form example illustrated in FIG. 1, the position of the highest part 6 of the groove surface 5 of groove 2 may be higher than the position of the extension line 8 of the non-formed parts 3 of the grooves.

Figure 2:
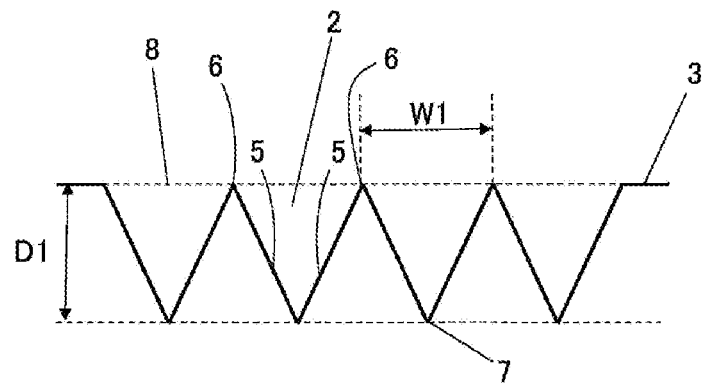
FIG. 2 includes schematic cross-sectional views illustrating a form example of grooves formed in a brazed member.

In the form example illustrated in FIG. 2, the cross-sectional shape at the time of cutting the groove 2 in the width direction is an approximate triangle and the shape of the groove surfaces 5 of groove 2 is an approximate V-shape. In the form example illustrated in FIG. 2, the highest part 6 of the groove surface 5 of one groove 2 and the highest part 6 of the groove surface 5 of the adjacent groove 2 are overlapped at the position of the extension line 8 of the non-formed parts 3 of the grooves. Therefore, in the form example illustrated in FIG. 2, the non-formed parts 3 between the adjacent grooves do not exist and the space (P1) between the adjacent grooves is 0.0 mm. In the form example illustrated in FIG. 2, the highest part 6 of the groove surface 5 of groove 2 is at the same height as the position of the extension line 8 of the non-formed parts 3 of the grooves. In the form example illustrated in FIG. 2, the position of the highest part 6 of the groove surface 5 of groove 2 may be higher than the position of the extension line 8 of the non-formed parts 3 of the grooves. In the form example illustrated in FIG. 2, the distance between the deepest part 7 of the groove 2 and the extension line 8 of the non-formed parts 3 of the grooves is the groove depth (D1) and the distance between the highest parts 6 of the groove surfaces 5 on both sides in the width direction of the groove 2 is the groove width (W1) of the groove 2.

Figure 3:
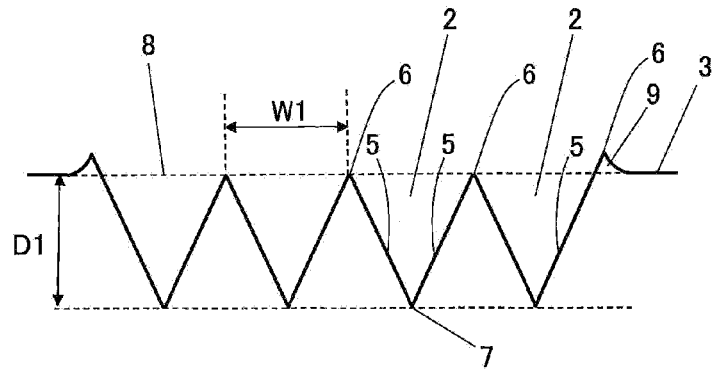
FIG. 3 is a schematic cross-sectional view illustrating a form example of grooves formed in a brazed member.

In the form example illustrated in FIG. 3, the cross-sectional shape at the time of cutting the groove 2 in the width direction is an approximate triangle and the shape of the groove surfaces 5 of groove 2 is an approximate V-shape. In the form example illustrated in FIG. 3, the highest part 6 of the groove surface 5 of one groove 2 and the highest part 6 of the groove surface 5 of the adjacent groove 2 are overlapped at the position of the extension line 8 of the non-formed parts 3 of the grooves. Therefore, in the form example illustrated in FIG. 3, the non-formed parts 3 between the adjacent grooves do not exist and the space (P1) between the adjacent grooves is 0.0 mm. In the form example illustrated in FIG. 3, a raised part 9 where the position of the highest part 6 is higher than the position of the extension line 8 of the non-formed parts 3 of the grooves is formed at the upper part outside in the width direction of grooves at both edges in the width direction. Therefore, in the form example illustrated in FIG. 3, the position of the highest part 6 of the groove surface 5 of groove 2 is the same height as the position of the extension line 8 of the non-formed parts 3 of the grooves except for the grooves at both ends in the wide direction, whereas the position of the highest parts 6 of the groove surfaces 5 outside in the width direction of the grooves at both edges in the width direction is higher than the position of the extension line 8 of the non-formed parts 3 of the grooves. In the form example illustrated in FIG. 3, the distance between the deepest part 7 of the groove 2 and the extension line 8 of the non-formed parts 3 of the grooves is the groove depth (D1) of the groove and the distance between the highest parts 6 of the groove surfaces 5 on both sides in the width direction of the groove 2 is the groove width (W1) of the groove 2.

Figure 4:
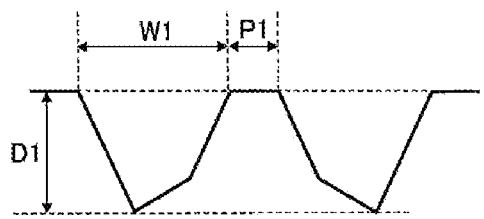
FIG. 4 includes schematic cross-sectional views illustrating a form example of grooves formed in a brazed member.
Figure 5:
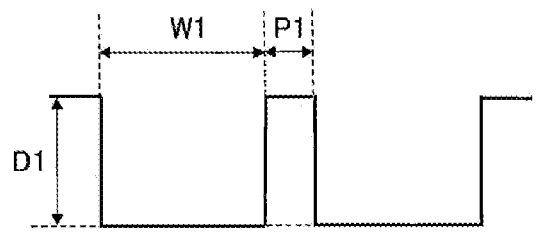
FIG. 5 is a schematic cross-sectional view illustrating a form example of grooves formed in a brazed member.

In the form examples illustrated in FIG. 4 and FIG. 5, the cross-sectional shape at the time of cutting the groove 2 in the width direction is an approximately quadrangle. In the form examples illustrated in FIG. 4 and FIG. 5, the sign D1 in FIG. 4 or FIG. 5 is the groove depth of the groove, the sign W1 is the groove width of the groove, and the sign P1 is the space between the adjacent grooves.

In the brazed aluminum member (2), a main groove and two or more sub-grooves provided at a groove bottom of the main groove are provided on a surface of the brazed aluminum member in a fillet formation area, a groove depth (D2) of the sub-grooves is 0.005 mm to 0.50 mm, a groove width (W2) of the sub-grooves is 0.005 mm to 0.40 mm, a ratio (W2/D2) of the groove width (W2) of the sub-grooves to the groove depth (D2) of the sub-grooves is 10.00 or less, and a ratio (D2/D3) of the groove depth (D2) of the sub-grooves to a groove depth (D3) of the main groove is 0.50 or more and less than 1.00. Providing such grooves in the fillet formation area of the joint allows the braze substance to flow along the grooves after the braze substance is flowed into the grooves due to capillary action, fillets to be formed continuously without forming discontinuous parts, and a sound brazed joint without fillet deficiency to be formed.

The surface of the brazed aluminum member (2) is provided with the main groove in which two or more sub-grooves are formed at the groove bottom. In the brazed aluminum member (2), the number of the sub-grooves provided on the groove bottom of the main groove is two or more, preferably four or more, and particularly preferably eight or more. A brazed aluminum member (2) having a number of the sub-grooves on the groove bottom of the main groove of less than the above range results in the insufficient amount of the braze substance flowing along the sub-grooves and thus a sound brazed joint is not formed.

In the brazed aluminum member (2), the groove depth (D2) of the sub-grooves formed at the groove bottom of the main groove is 0.005 mm to 0.50 mm, preferably 0.005 mm to 0.40 mm, and particularly preferably 0.005 to 0.20 mm for any sub-grooves. A brazed aluminum member (2) having a groove depth (D2) of the sub-grooves within the above range allows good brazing properties to be secured because the wetting and spreading properties of the brazing material to the brazed member are improved during heating for brazing. On the other hand, a brazed aluminum member (2) having a groove depth (D2) of less than the above range results in insufficient action of the capillary action and thus a sound brazed joint cannot be formed, whereas a brazed aluminum member (2) having a groove depth (D2) of more than the above range results in the insufficient amount of brazing material due to the consumption of the melted braze substance for filling the grooves and thus good brazing properties cannot be secured.

In the brazed aluminum member (2), the groove width (W2) of the sub-grooves provided at the groove bottom of the main groove is 0.005 mm to 0.40 mm, preferably 0.005 mm to 0.35 mm, and particularly preferably 0.005 mm to 0.30 mm for any grooves. A brazed aluminum member (2) having a groove width (W2) of the sub-groove within the above range allows good brazing properties to be secured because the wetting and spreading properties of the brazing material to the brazed member are improved during heating for brazing. On the other hand, a brazed aluminum member (2) having a groove width (W2) of the sub-groove of less than the above range results in narrow flow paths for the melted braze substance and thus a sound brazed joint cannot be formed and good brazing properties cannot be secured, whereas a brazed aluminum member (2) having a groove width (W2) of more than the above range results in the insufficient amount of braze substance due to the consumption of the melted braze substance for filling the grooves and thus good brazing properties cannot be secured.

In the brazed aluminum member (2), the ratio (W2/D2) of the groove width (W2) of the sub-grooves to the groove depth (D2) of the sub-grooves is 10.00 or less, preferably 0.20 to 5.00, and particularly preferably 0.50 to 5.00 for any grooves. A brazed aluminum member (1) having a ratio W2/D2 within the above range allows good brazing properties to be secured because the wetting and spreading properties of the brazing material to the brazed member are improved during heating for brazing. On the other hand, a brazed aluminum member (1) having a ratio W2/D2 of more than the above range results in insufficient action of the capillary action and thus a sound brazed joint is not formed.

In the brazed aluminum member (2), the ratio (D2/D3) of the groove depth (D2) of the sub-grooves to the groove depth (D3) of the main groove is 0.50 or more and less than 1.00, preferably 0.60 to 0.95, and particularly preferably 0.70 to 0.95. A brazed aluminum member (1) having a ratio D2/D3 within the above range allows good brazing properties to be secured because the wetting and spreading properties of the brazing material to the brazed member are improved during heating for brazing. On the other hand, a brazed aluminum member (1) having a ratio D2/D3 of more than the above range results in insufficient action of the capillary action and thus a sound brazed joint is not formed.

In the brazed aluminum member (2), the groove width (W3) of the main groove formed on the surface of the fillet formation position of the brazed aluminum member is appropriately selected depending on the number of sub-grooves, the groove width (W2) of the sub-grooves, the distance between adjacent sub-grooves, and the like.

In the brazed aluminum member (2), the groove depth (D2) of the sub-grooves refers to the distance between the deepest part of the sub-grooves and a line connecting the highest parts of the groove surfaces of the sub-grooves in the cross-section cut in the direction (width direction) perpendicular to the groove extension direction. The groove width (W2) of the sub-grooves refers to the distance between the highest parts of the groove surfaces on both sides in the width direction of the sub-groove in the cross-section cut in the direction (width direction) perpendicular to the groove extension direction. The groove depth (D3) of the main groove refers to the distance between the deepest part of the sub-groove and the extension line of the non-formed parts of the grooves in the cross-section cut in the direction (width direction) perpendicular to the groove extension direction. The groove width (W3) of the main groove refers to the distance between the highest parts of the groove surfaces of the main groove in the cross-section cut in a direction (width direction) perpendicular to the groove extension direction.

In the brazed aluminum member (2), examples of the cross-sectional shape at the time of cutting the main groove and the sub-groove in the width direction include an approximate triangle and an approximate quadrangle and examples of the shape of the sub-groove surfaces include an approximate V-shape. In the brazed aluminum member (2), flat parts may exist between the adjacent sub-grooves or the flat parts may not exist between the adjacent sub-grooves. In the brazed aluminum member (2), a raised part where the position of the highest part is higher than the position of the extension line of the non-formed parts of the grooves may be formed at the upper part of the groove surface of the main groove.

Figure 6:
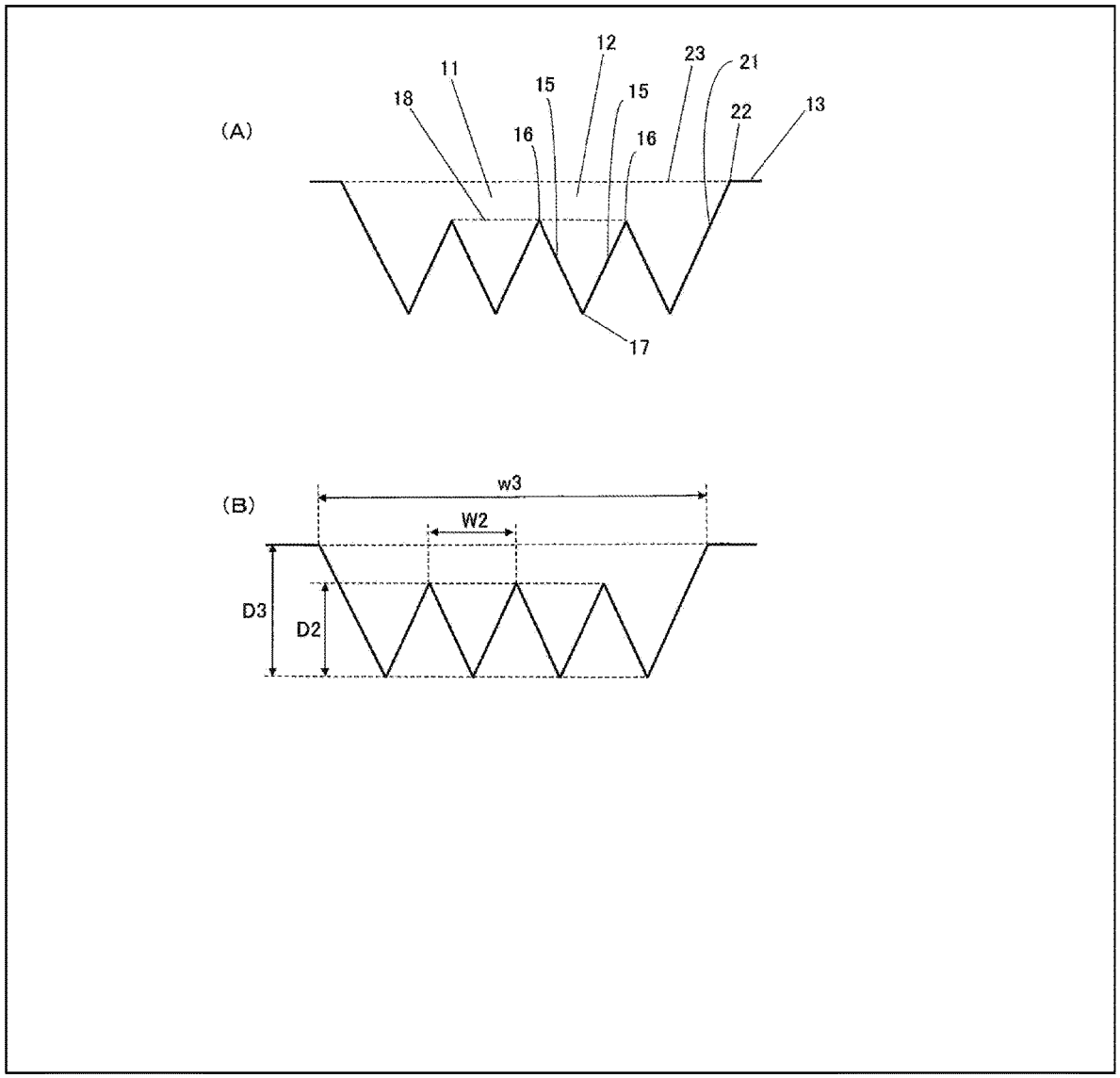
FIG. 6 includes schematic cross-sectional views illustrating a form example of grooves formed in a brazed member.
Figure 7:
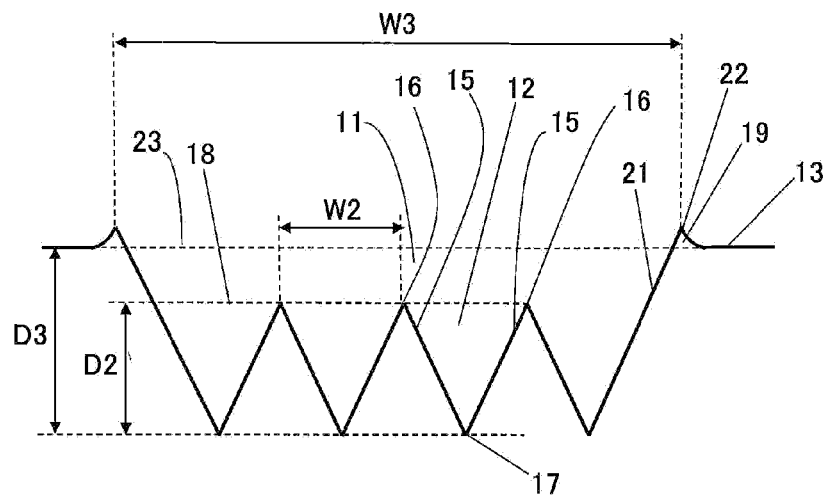
FIG. 7 is a schematic cross-sectional view illustrating a form example of grooves formed in a brazed member.

Referring to FIG. 6 and FIG. 7, the main groove and the sub groove formed in the brazed aluminum member (2) will be described in detail. FIG. 6 and FIG. 7 are schematic cross-sectional views illustrating the form examples of the main groove and sub-groove formed in the brazed aluminum member (2). In FIG. 6, the groove depth (D2) of a sub-groove 12 refers to the distance between a deepest part 17 of the sub-groove 12 and a line 18 connecting highest parts 16 of groove surfaces 15 of the sub-grooves 12. The groove width (W2) of the sub-grooves 12 refers to the distance between the highest parts 16 of the groove surfaces 15 on both sides of the sub-grooves 2 in the width direction. The groove depth (D3) of a main groove 11 refers to the distance between the deepest part 17 of the sub-groove 12 and an extension line 23 of non-formed parts 13 of the grooves. The groove width (W3) of the main groove 11 refers to the distance between highest parts 22 of groove surfaces 21 of the main groove 11.

In the form example illustrated in FIG. 6, the sub-grooves 12 are provided at the bottom of the main groove 11, the cross-sectional shape of the sub-groove 12 at the time of cutting the main groove 11 and sub-groove 12 in the width direction is an approximate triangle, and the shape of the groove surfaces 15 of sub-groove 12 is an approximate V shape. In the form example illustrated in FIG. 6, the highest part 16 of the groove surface 15 of one sub-groove 12 and the highest part 16 of the groove surface 15 of the adjacent sub-groove 12 are overlapped at the position of a line 18 connecting the highest parts 16 of the groove surfaces 15 of the sub-grooves 12. Therefore, in the form example illustrated in FIG. 6, flat parts of the sub-grooves between the adjacent sub-grooves do not exist and the space between the adjacent sub-grooves is 0.0 mm. In the form example illustrated in FIG. 6, the distance between the deepest part 17 of the sub-groove 12 and the extension line 18 connecting the highest parts 16 of the groove surfaces 15 of the sub-grooves 12 is the groove depth (D2) of the sub-grooves and the distance between the highest parts 16 of the groove surfaces 15 on both sides in the width direction of the sub-grooves 12 is the groove width (W2) of the sub-grooves 12. The distance between the deepest part 17 of the sub-groove 12 and the extension 23 of the non-formed parts 13 of the grooves is the groove depth (D3) of the main groove, and the distance between the highest parts 22 of the groove surfaces 21 on both sides of the main groove 11 is the groove width (W3) of the main groove 11.

In the form example illustrated in FIG. 7, the sub-grooves 12 are provided at the bottom of the main groove 11, the cross-sectional shape of the sub-groove 12 at the time of cutting the main groove 11 and sub-groove 12 in the width direction is an approximate triangle and the shape of the groove surfaces 15 of sub-groove 12 is an approximate V shape. In the form example illustrated in FIG. 7, the highest part 16 of the groove surface 15 of one sub-groove 12 and the highest part 16 of the groove surface 15 of the adjacent sub-groove 12 are overlapped at the position of a line 18 connecting the highest parts 16 of the groove surfaces 15 of the sub-grooves 12. Therefore, in the form example illustrated in FIG. 7, flat parts of the sub-grooves between the adjacent sub-grooves do not exist and the space between the adjacent sub-grooves is 0.0 mm. In the form example illustrated in FIG. 7, a raised part 19 where the height of a highest part 22 is higher than the position of the non-formed part 13 of the grooves is formed at the upper part of the groove surface 21 of the main groove 11. In the form example illustrated in FIG. 7, the distance between the deepest part 17 of the sub-groove 12 and the extension line 18 connecting the highest parts 16 of the groove surfaces 15 of the sub-grooves 12 is the groove depth (D2) of the sub-grooves and the distance between the highest parts 16 of the groove surfaces 15 on both sides in the width direction of the sub-grooves 12 is the groove width (W2) of the sub-grooves 12. The distance between the deepest part 17 of the sub-groove 12 and the extension 23 of the non-formed parts 13 of the grooves is the groove depth (D3) of the main groove, and the distance between the highest parts 22 of the groove surfaces 21 on both sides of the main groove 11 is the groove width (W3) of the main groove 11.

In the brazed aluminum member (1 or 2), the grooves are provided on the surface of the brazed aluminum member (1 or 2) in the fillet formation area. Hereinafter, the position where the grooves are provided in the brazed aluminum member (1) refers to the position where two or more grooves are provided and the position where the grooves are provided in the brazed aluminum member (2) refers to the position where the main grooves and sub-grooves are provided.

Figure 8:
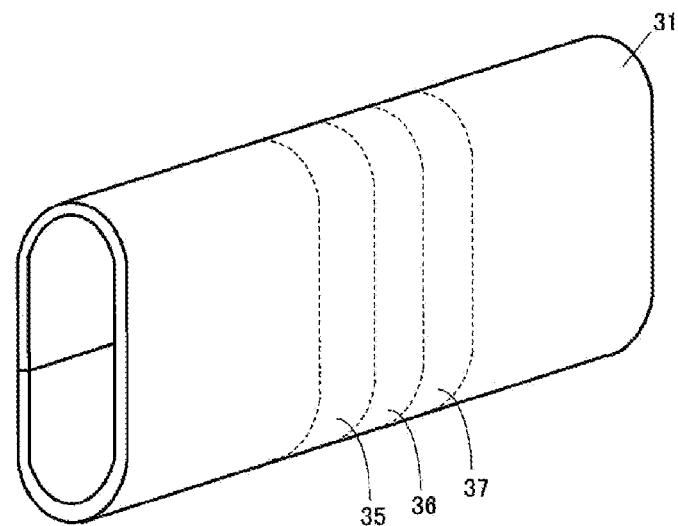
FIG. 8 is a schematic perspective view illustrating a form example of a tube material.
Figure 9:
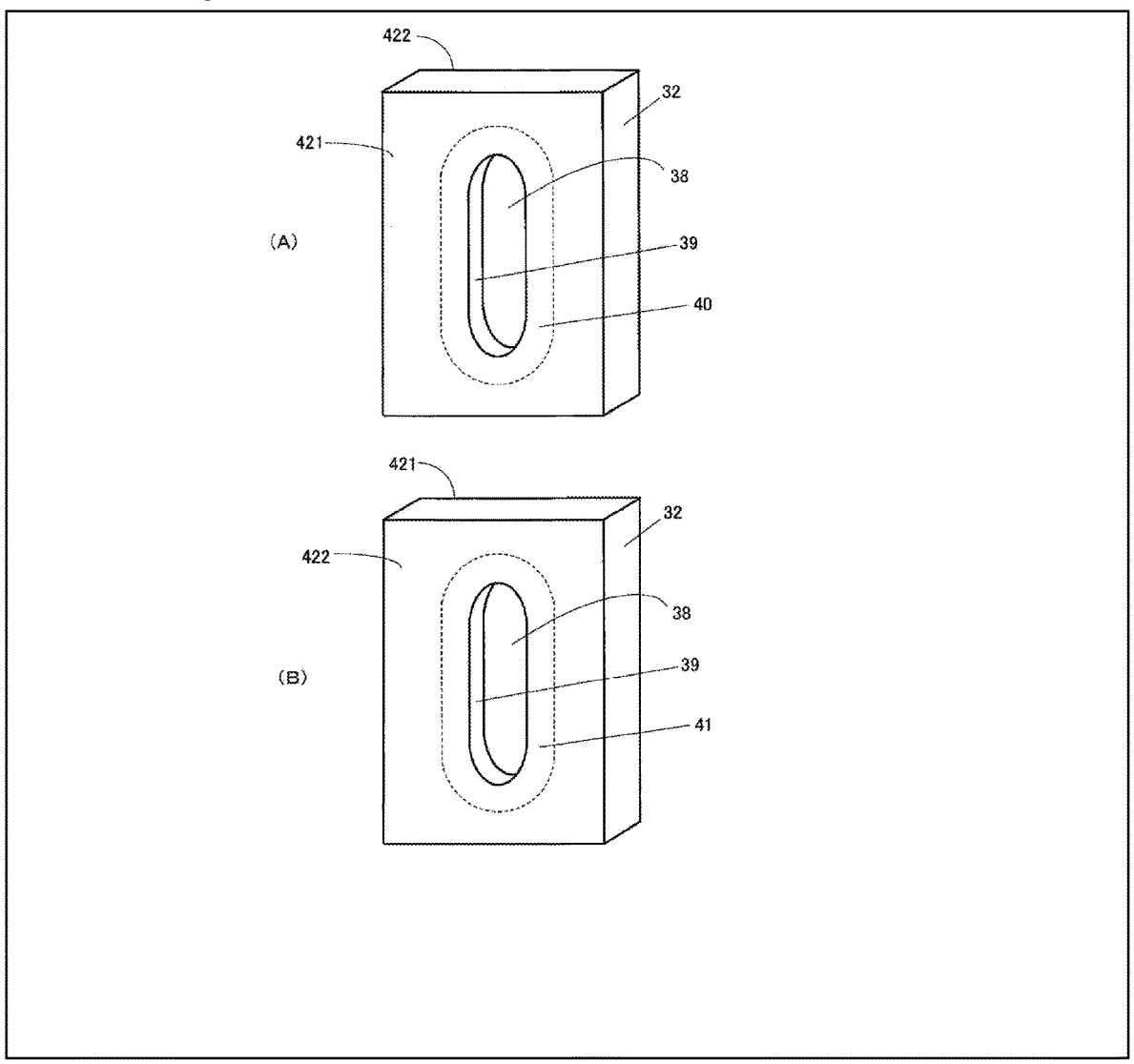
FIG. 9 includes schematic perspective views illustrating a form example of a plate material.
Figure 10:
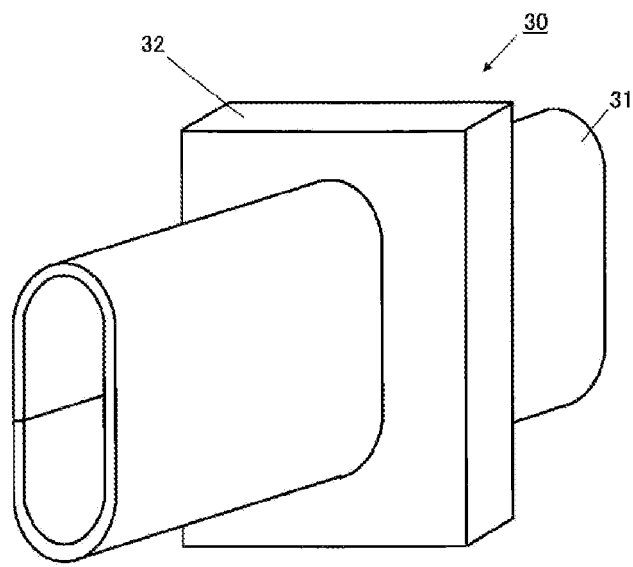
FIG. 10 is a schematic perspective view illustrating an assembled product of the tube material illustrated in FIG. 8 and the plate material illustrated in FIG. 9.

The position where the grooves are provided on the surface of the brazed aluminum member (1 or 2) will be described in detail. FIG. 8 is a schematic perspective view illustrating the form example of the tube material before being assembled. FIG. 9 includes schematic perspective views illustrating the form example of the plate material before being assembled. (A) is a view seen from a surface 421 side, whereas (B) is a view seen from a surface 422 side. FIG. 10 is a schematic perspective view illustrating the form example of the tube material and the plate material after being assembled. An assembled product 30 before brazing is assembled by inserting a tube material 31 formed in the shape of a tube into an insertion opening 38 of a plate material 32. The assembled product 30 is then heated for brazing to form a fillet at the joint site and the brazed product (not illustrated) is produced.

(1) In the case where the tube material 1 is the brazed aluminum member (1 or 2) and the plate material 2 is the member formed of the brazing sheet according to the present invention, the part of tube material 1 indicated by a sign 36 is the part facing the member formed of the brazing sheet and the parts indicated by a sign 35 and a sign 37 is parts not facing the member formed of the brazing sheet. The combined area of the part 35, the part 36, and the part 37 is the fillet formation area of the brazed aluminum member (1 or 2).

In the case of (1), the grooves may be formed somewhere in the fillet formation area. In other words, the grooves may be formed in any one of the part 35, the part 36, and the part 37. The grooves are preferably formed at least in the part 36, and the grooves are particularly preferably formed in each of the part 35, the part 36, and the part 37.

(2) In the case where the plate material 1 is a brazed aluminum member (1 or 2) and the tube material 2 is a member formed of the brazing sheet according to the present invention, the part of the plate material 2 indicated by a sign 39 is the part facing the member formed of the brazing sheet and the parts indicated by a sign 40 and a sign 41 are the parts not facing the member formed of the brazing sheet. The combined area of the part 39, the part 40, and the part 41 is the fillet formation area of the brazed aluminum member (1 or 2).

In the case of (2), the grooves may be formed somewhere in the fillet formation area. In other words, the grooves may be formed in any one of the part 39, the part 40, and the part 41. The grooves are preferably formed at least in the part 39 and the grooves are particularly preferably formed in each of the part 39, the part 40, and the part 41.

In the brazed aluminum member (1 or 2), the direction in which the grooves extend is the longitudinal direction of the formed fillet. The longitudinal direction of the formed fillet refers to a direction perpendicular to the width direction of the formed fillet.

Figure 11:
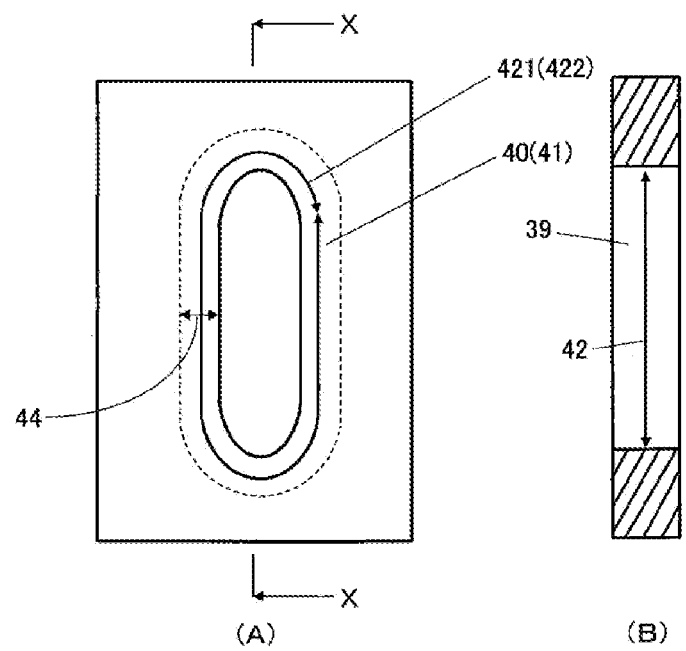
FIG. 11 includes views for illustrating an extending direction of the groove in the plate material.
Figure 12:
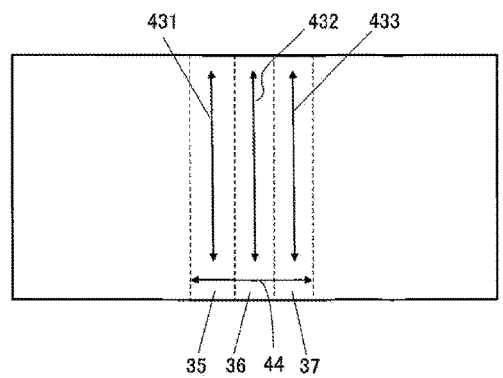
FIG. 12 is a view for illustrating an extending direction of the groove in the tube material.

In the brazed aluminum member (1 or 2), the direction in which the grooves extend will be described in detail. FIG. 11 includes views illustrating the direction in which the grooves extend with respect to the plate material illustrated in FIG. 9. (A) is a view seeing a surface 421 (422) side, and (B) is a cross-sectional view taken along the line X-X in (A). FIG. 12 is a view illustrating the direction in which the grooves extend with respect to the tube material illustrated in FIG. 8. In FIG. 11, the direction in which the grooves extend is a direction indicated by a sign 421 (422) in a part 40 (41) and a direction indicated by a sign 42 in a part 39. In FIG. 11, the fillet is formed so as to be surrounding the joint part between the plate material and the tube material, so that the directions 421 (422) and 42 in which the grooves extend are the longitudinal direction of the formed fillet. In other words, in FIG. 11, the directions 421 (422) and 42 in which the grooves extend are perpendicular to a width direction 44 of the formed fillet. In FIG. 12, the direction in which the grooves extend is the direction indicated by a sign 431 in a part 35, the direction indicated by a sign 432 in a part 36, and the direction indicated by a sign 433 in a part 37. In FIG. 12, the fillet is formed so as to be surrounding the joint part between the plate material and the tube material, so that the directions 431, 432, and 433 in which the grooves extend are the longitudinal direction of the formed fillet. In other words, in FIG. 12, the directions 431, 432, and 433 in which the grooves extend are perpendicular to the width direction 44 of the formed fillet.

Figure 13:
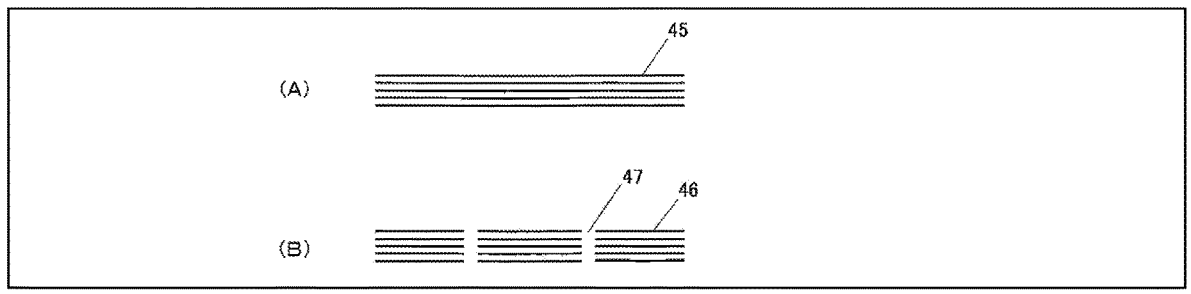
FIG. 13 includes schematic views illustrating a form example of the grooves.

In the brazed aluminum member (1 or 2), the groove may be continuous from one edge to the other edge or deficient parts may exist in the middle of the grooves to the extent that the effect of the present invention is not impaired. Grooves 45 in the form example illustrated in FIG. 13(A) are continuous grooves from one edge to the other edge. Grooves 46 in the form example illustrated in FIG. 13(B) have deficient parts 47 in the middle of the grooves.

In the case where the brazed aluminum member (1 or 2) is a tube material in which a sheet-like material is formed into a tube shape, the sheet thickness is about 0.15 mm to 0.50 mm, and in the case where the tube material is a clad material, the clad ratio of the cladding material is usually about 5% to 30%. In the case where the brazed aluminum member (1 or 2) is a plate material in which a sheet-like material is formed into the shape of a plate, the sheet thickness is about 0.80 mm to 5.00 mm, and in the case where the plate material is a clad material, the clad ratio of the cladding material is about 5% to 30%.

In the case where the brazed aluminum member (1 or 2) is an extruded pipe for a coolant flow path, the outer diameter of the pipe is about 6.0 mm to 20.0 mm and the clad ratio of the cladding material in the case of being used for a clad pipe is usually about 3% to 30%. In the case where the brazed aluminum member (1 or 2) is an extruded multi-hole pipe for a coolant flow path, the width of the multi-hole pipe is about 10.0 mm to 100 mm, the thickness is about 1.0 mm to 3.0 mm, the wall thickness is about 0.10 mm to 0.30 mm, and the number of the holes in the multi-hole pipe is about 2 to 30.

A method for producing the brazed aluminum member (1 or 2) will be described. Cast Ingots for a bare material or cast ingots for the core material and cast ingots for a clad layer are produced by melting and casting an aluminum alloy having a desired chemical composition used for the bare material in the case where the brazed aluminum member (1 or 2) is the formed product of a sheet-like bare material first or an aluminum alloy having a desired chemical composition used for the core material or the clad layer to be clad to the core material in the case where the brazed aluminum member (1 or 2) is the formed product of the clad material of the sheet-like material. These methods for melting and casting are not particularly limited and common methods may be used.

Subsequently, the above cast ingots are subjected to homogenization, if necessary. The preferable temperature range of the homogenization is 400° C. to 630° C. and the homogenization time is 2 hours to 20 hours.

Subsequently, the cast ingots for the bare material and the cast ingots for the core material are subjected to facing, the cast ingots for the cladding layer are subjected to the facing, and these cast ingots are further hot rolled to have a specified thickness. With respect to the clad material, the stacked product is formed by laminating the core material and the cast ingot for the clad layer in a specified order.

In the hot working, the stacked product formed by stacking the predetermined cast ingot for the bare material in the case of the bare material or laminating the cast ingot for the core material and the cast ingot for the clad layer in the specified order is hot-rolled at 400° C. to 550° C. In the hot rolling, for example, the stacked product is rolled until a thickness becomes 2.0 mm to 8.0 mm.

In cold working, hot-rolled products obtained by the hot working are rolled in a cold state. In the cold working, the rolling in the cold state is performed in a plurality of passes.

In the cold working, an intermediate annealing temperature is 200° C. to 500° C. and preferably 250° C. to 400° C. in the case where the intermediate annealing is performed during the passes through the rolls in the cold state. In the intermediate annealing, the temperature may be raised to the intermediate annealing temperature and cooling may be started immediately after the temperature reaches the intermediate annealing temperature or the cooling may be started after the temperature may be held at the intermediate annealing temperature for a certain time after the temperature reaches the intermediate annealing temperature. The holding time at the intermediate annealing temperature is 0 hour to 10 hours and preferably 1 hour to 5 hours.

After the cold rolling, final annealing in which the cold-rolled products obtained by the cold working are subjected to annealing at 300° C. to 500° C. and preferably 350° C. to 450° C. is performed. In the final annealing, the temperature may be raised to the intermediate annealing temperature and cooling may be started immediately after the temperature reaches the intermediate annealing temperature or the cooling may be started after the temperature may be held at the intermediate annealing temperature for a certain time after the temperature reaches the intermediate annealing temperature. The holding time at the final annealing temperature is 0 hour to 10 hours and preferably 1 hour to 5 hours. In the case of the tube material, this final annealing may be performed or may not be performed.

As described above, the sheet-like bare material or clad material is obtained.

With respect to the sheet-like bare material or clad material, etching the bare material or the clad material before brazing further improves the brazing properties. As acids, aqueous solutions comprising one or more of sulfuric acid, hydrochloric acid, nitric acid, phosphoric acid, and hydrofluoric acid may be used. The preferable etching amount range is 0.05 g/m$^2$ to 2.0 g/m$^2$.

The brazed aluminum member (1 or 2) is obtained by forming into the predetermined shape of the brazed aluminum member (1 or 2) after the grooves are formed in the predetermined positions in the sheet-like bare material or clad material thus obtained or by forming the grooves in the predetermined positions at the same time when the material is formed into the predetermined shape of the brazed aluminum member (1 or 2). When the predetermined grooves are provided in the fillet forming area, the grooves may also be provided out of the fillet forming area.

In the present invention, the method for providing the grooves at the predetermined positions on the brazed aluminum member (1 or 2) is not particularly limited. For example, known methods are appropriately used. Examples of the methods for providing the grooves at the predetermined positions include a method for compressing the plate material with a press die at the time of press forming the plate material to provide the grooves at predetermined positions on the surface of the plate material or a method for sliding a blade tool after pressing to provide the grooves at the predetermined positions on the surface of the plate material. Examples of the method for providing the grooves at the predetermined positions also include a method for providing a protruded part on the side surface of the piercing die at the time of the piercing for providing a hole for inserting the tube material into the plate material to provide the grooves at the cut surface of the hole in the plate material (in the case of the form illustrated in FIG. 9, a part 39 facing the brazing sheet) or a method for sliding the blade tool in the longitudinal direction or circumferential direction of the tube after the piercing to provide the grooves. Examples of the method for providing the grooves at the predetermined positions also include a method for pressing the blade tool along the tube in the travel direction of the tube at the time of forming the tube material to provide the grooves at the predetermined positions on the surface of the tube material or a method for sliding the blade tool against the tube material at the time of assembling the tube material and the plate material to provide the grooves at the predetermined positions on the surface of the tube material.

In the case where the brazed aluminum member (1 or 2) is an extruded piping material, a melted aluminum alloy is formed into ingots in accordance with a usual method to obtain ingots (billets) having a predetermined composition. Subsequently, after the obtained ingots (billets) are subjected to homogenization, the billets are reheated at the time of extrusion and port-hole extrusion is performed to produce the extruded piping material so that the wall thickness of the pipe after the extrusion is a specific dimension. The preferable temperature range of the homogenization is 400° C. to 630° C. and the homogenization time is 2 hours to 20 hours. The preferable extrusion temperature range is 400° C. to 550° C. The preferable extrusion ratio is 10 to 200. The preferable range of the wall thickness of the tube after the extrusion is 0.50 mm to 10.00 mm.

The extruded piping material is further subjected to drawing, subjected to annealing, if necessary, further subjected to drawing, and subjected to final annealing, if necessary. The preferable temperature range of the annealing is 300° C. to 500° C. and the annealing time is 0 hour to 10 hours. The preferable range of the final wall thickness for the drawn tube is 0.10 mm to 3.0 mm.

With respect to the extruded piping material, etching the extruded pipe before brazing further improves the brazing properties. As acids, aqueous solutions comprising one or more of sulfuric acid, hydrochloric acid, nitric acid, phosphoric acid, and hydrofluoric acid may be used. The preferable etching amount range is 0.05 g/m$^2$ to 2.0 g/m$^2$.

The brazed aluminum member (1 or 2) is obtained by forming the grooves at predetermined positions of the extruded piping material thus obtained. In the case where the grooves are provided in the part in which fillets are formed, the grooves may also be provided out of the part in which fillets are formed when the predetermined grooves are provided at the positions where the fillets are formed.

In the present invention, the method for providing the grooves at the predetermined positions on the brazed aluminum member (1 or 2) is not particularly limited. For example, known methods are appropriately used. In the case where the extruded piping material is used as a header plate, examples of the method for providing the grooves at the predetermined positions include a method for sliding the blade tool while the extruded piping material is being rotated to form the grooves in the fillet formation area of the extruded piping material and a method for sliding the blade tool while the extruded piping material is being continuously fed in the longitudinal direction to form the grooves in the fillet formation area of the extruded piping material. Examples of the method for providing the grooves at the predetermined positions also include a method for providing a protruded part on the side surface of the piercing die at the time of piercing for providing a hole for inserting the tube material to provide the grooves at the cut surface or a method for sliding the blade tool in the longitudinal direction or circumferential direction of the tube after the piercing to provide the grooves at the cut surface. In the case where the extruded piping material is used as the tube material, examples of the method for providing the grooves at the predetermined positions also include a method for pressing the blade tool along the travel direction of the tube at the time of feeding the extruded piping material to provide the grooves at the predetermined positions on the surface of the extruded piping material or a method for sliding the blade tool against the tube material at the time of assembling the tube material and the plate material to provide the grooves at the predetermined positions on the surface of the tube material.

In the case where the brazed aluminum member (1 or 2) is an extruded multi-hole pipe material, a melted aluminum alloy is formed into ingots in accordance with a usual method to obtain ingots (billets) having a predetermined composition. Subsequently, after the obtained ingots (billets) are subjected to homogenization, the billets are reheated at the time of extrusion and port-hole extrusion is performed to produce the extruded multi-hole pipe material so that the wall thickness of the pipe after the extrusion is a specific dimension. The preferable temperature range of the homogenization is 400° C. to 630° C. and the homogenization time is 2 hours to 20 hours. The preferable extrusion temperature range is 400° C. to 550° C. The preferable extrusion ratio is 50 to 2,500.

Thereafter, the final annealing is applied, if necessary. The preferable temperature range of the final annealing is 300° C. to 500° C. and the annealing time is 0 hour to 50 hours. The produced extruded multi-hole pipe may be sized to improve external dimensional accuracy. In this case, a preferable range for the degree of processing is 0.5% to 10%.

With respect to the extruded multi-hole pipe material, etching the extruded pipe before brazing further improves the brazing properties. As acids, aqueous solutions comprising one or more of sulfuric acid, hydrochloric acid, nitric acid, phosphoric acid, and hydrofluoric acid may be used. The preferable etching amount range is 0.05 g/m$^2$ to 2.0 g/m$^2$.

The brazed aluminum member (1 or 2) is obtained by forming the grooves at a predetermined positions of the extruded multi-hole pipe material thus obtained. When the predetermined grooves are provided in the fillet forming area, the grooves may also be provided out of the fillet forming area.

In the present invention, the method for providing the grooves at the predetermined positions on the brazed aluminum member (1 or 2) is not particularly limited. For example, known methods are appropriately used. In the case where the extruded multi-hole pipe material used as the tube material, examples of the method for providing the grooves at the predetermined positions also include a method for pressing the blade tool along the tube travel direction at the time of feeding the extruded multi-hole pipe material to provide the grooves at the predetermined positions on the surface of the extruded multi-hole pipe material or a method for sliding the blade tool against the tube material at the time of assembling the tube material and the plate material to provide the grooves at the predetermined positions on the surface of the tube materials.

A method for producing a brazed product of the first embodiment of the present invention is a method for producing a brazed product, the method comprising:

assembling a member formed of a brazing sheet and a brazed aluminum member; and thereafter performing heating for brazing, in which a brazing material of the brazing sheet is formed of an aluminum alloy comprising 3.00 mass % to 13.00 mass % of Si and formed with the balance being Al and inevitable impurities, a core material is formed of an aluminum alloy comprising 3.00 mass % or less (including zero) of Mg and formed with the balance being Al and inevitable impurities;

two or more grooves are provided on a surface of the brazed aluminum member in a fillet forming area, a groove depth (D1) of the grooves is 0.005 mm to 0.50 mm, a groove width (W1) of the grooves is 0.005 mm to 0.50 mm, a ratio (W1/D1) of the groove width (W1) to the groove depth (D1) is 10.00 or less, and a space (P1) between the adjacent grooves is 0.00 mm to 0.30 mm.

A method for producing a brazed product of the second embodiment of the present invention is a method for producing a brazed product, the method comprising:

assembling a member formed of a brazing sheet and a brazed aluminum member; and thereafter performing heating for brazing, in which a brazing material of the brazing sheet is formed of an aluminum alloy comprising 3.00 mass % to 13.00 mass % of Si and 3.00 mass % or less (not including zero) of Mg and formed with the balance being Al and inevitable impurities, a core material of the brazing sheet is formed of an aluminum alloy comprising 3.00 mass % or less (including zero) of Mg and formed with the balance being Al and inevitable impurities;

a main groove and two or more sub-grooves provided at a groove bottom of the main groove are provided on a surface of the brazed aluminum member in a fillet forming area, a groove depth (D2) of the sub-grooves is 0.005 mm to 0.50 mm, a groove width (W2) of the sub-grooves is 0.005 mm to 0.40 mm, a ratio (W2/D2) of the groove width (W2) to the groove depth (D2) of the sub-grooves is 10.00 or less, and a ratio (D2/D3) of a groove depth (D2) of the main groove to the groove depth (D3) of the sub-grooves is 0.50 or more and less than 1.00.

In other words, the method for producing the brazed product of the first embodiment of the present invention is a method for using the above brazed aluminum member (1) as the brazed member and using the member formed of the above brazing sheet according to the present invention as the member formed of the brazing sheet, assembling at least the member formed of the brazing sheet according to the present invention and the brazed aluminum member (1) to produce an assembled product, and thereafter performing heating for brazing without using a flux to produce the brazed product. In addition, the method for producing the brazed product of the second embodiment of the present invention is a method for using the above brazed aluminum member (2) as the brazed member and using the member formed of the above brazing sheet according to the present invention as the member formed of the brazing sheet, assembling at least the member formed of the brazing sheet according to the present invention and the brazed aluminum member (2) to produce an assembled product, and thereafter performing heating for brazing without using a flux to produce the brazed product.

The brazed member according to the method for producing the brazed product of the first embodiment of the present invention is the same as the brazed aluminum member (1). The brazed member according to the method for producing the brazed product of the second embodiment of the present invention is the same as the brazed aluminum member (2). The members formed of the brazing sheets according to the method for producing the brazed product of the first embodiment of the present invention and the method for producing the brazed product of the second embodiment are the same as member formed of the above brazing sheets according to the present invention.

In the method for producing the brazed product of the first embodiment of the present invention and the method for producing the brazed product of the second embodiment of the present invention, at least the member formed of the brazing sheet and the brazed member are assembled. However, in addition to these, the members such as bare fins, pipes, blocks, and the like can also be assembled, if necessary, to prepare the assembled product.

In the method for producing the brazed product of the first embodiment of the present invention and the method for producing the brazed product of the second embodiment of the present invention, the prepared assembled product is brazed by performing heating for brazing without using the flux to obtain the brazed product. In other words, the method for producing the brazed product of the first embodiment of the present invention and the method for producing the brazed product of the second embodiment of the present invention are the methods for producing the brazed product by flux-free brazing methods.

In the method for producing the brazed product of the first embodiment of the present invention and the method for producing the brazed product of the second embodiment of the present invention, a heating temperature for brazing at the time of heating for brazing the brazed product is, for example, 577° C. to 610° C. and preferably 590° C. to 600° C., and the brazing time is, for example, 5 minutes to 20 minutes and preferably 5 minutes to 10 minutes at 590° C. or more. A brazing atmosphere is an atmosphere of an inert gas such as nitrogen gas.

The brazed products produced by the method for producing the brazed product of the first embodiment of the present invention and the method for producing the brazed product of the second embodiment of the present invention are not particularly limited. Examples of the brazed products include aluminum alloy heat exchangers and heat sinks for household use, automobiles, and various industrial applications.

Hereinafter, the present invention will be specifically described with reference to Examples. The present invention, however, is not limited to Examples described below.

EXAMPLES

In Examples and Comparative Examples described below, jointed joints were prepared between brazed members having grooves and brazing sheets to evaluate brazing properties. In the brazed aluminum member according to the present invention, the brazing properties are the same as the brazing properties of the jointed joint between the brazed member having the grooves and the brazing sheet described below even when the brazed member provided with the grooves is a sheet-like formed product or an extruded pipe and an extruded multi-hole pipe.

Examples and Comparative Examples

Figure 14:
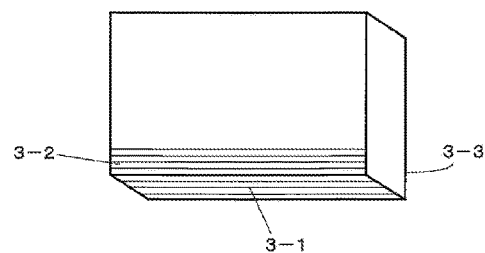
FIG. 14 is a view illustrating for groove formation area in Examples.

A 3003-alloy cast ingot was prepared by continuous casting as the brazed member, the cast ingot was subjected to facing to achieve a specified thickness, thereafter the cast ingot was homogenized, and thereafter the homogenized product was hot rolled, cold rolled, and annealed to prepare a sheet-like material having a thickness of 1.0 mm. The prepared sheet-like material was further subjected to acid cleaning. Subsequently, respective samples of providing grooves at a part 3-1, providing grooves at a part 3-2, providing groove at a part 3-3, grooves at both part 3-2 and part 3-3, and providing grooves at a part 3-1, a part 3-2, and a part 3-3 illustrated in FIG. 14 were prepared. The forms of the grooves are forms in which W1, D1, and P1 in FIG. 1 are the values listed in Table 2 and forms in which W2, D2, and D3 in FIG. 6 are the values listed in Table 3.

With respect to the brazing sheets to be combined with the brazed members, cast ingots for brazing materials, cast ingots for core materials, and cast ingots for cladding materials having the chemical compositions listed in Table 1 were prepared by continuous casting. Subsequently, the cast ingots for the core materials were homogenized and subjected to facing to prepare the cast ingots having a predetermined sheet thickness. The cast ingots for the brazing materials and the cast ingot for the cladding material were homogenized, thereafter subjected to facing, and hot-rolled to prepare the cast ingots having a predetermined sheet thickness. The cast ingots for brazing materials, the cast ingot for cladding material, and the cast ingots for core materials thus obtained were stacked in combinations listed in Table 1 to produce stacked products. The obtained stacked products were subjected to hot-rolling to join the cast ingots for the brazing materials, the cast ingot for the cladding material, the and cast ingots for the core materials to produce a clad material having a sheet thickness of 3.00 mm. The obtained clad material was subjected to cold rolling, final annealing, and acid cleaning in this order to give a test material having a thickness of 0.80 mm.

<Evaluation of Brazing Properties>

The brazing properties of each test material was evaluated by a clearance filling test. As illustrated in FIG. 15, in a test body used in the clearance filling test, the brazed member provided with the grooves was arranged as a vertical sheet, the brazing sheet was arranged as a horizontal sheet, and the vertical sheet and the horizontal sheet were assembled with SUS wires so that the grooves of the vertical sheet were close to the horizontal sheet to braze in a furnace under a nitrogen atmosphere. As the atmosphere in the furnace, an oxygen concentration was set to 10 volumetric ppm or less and a maximum temperature of the test body was set to 600° C.

In the clearance filling test, the brazing property was evaluated based on the length FL of the fillet formed after the brazing. In Table 2 and Table 3, FLs are listed in the "Clearance filling test" column, which have excellent brazing properties in the case of 15 mm or more, have good brazing properties and are determined to be acceptable in the case of 12 mm or more, and have inferior brazing properties and are determined to be unacceptable in the case of less than 12 mm.

TABLE 1

| Test No. material | Sheet (mm) thickness | Clad structure | Chemical composition (mass %) |  |  |  |  |  |  |  |  | Clad (%) ratio |
|---|---|---|---|---|---|---|---|---|---|---|---|---|
|  |  |  | Si | Fe | Cu | Mn | Mg | Zn | Ti | Bi | Sr |  |
| 3003 | 1.0 | Bare | 0.27 | 0.2 | 0.15 | 1.2 | — | 0.01 | 0.01 | — | — | — |
| 1 | 1.0 | Brazing material | 10.5 | 0.22 | — | 0.02 | — | — | — | 0.1 | — | 10 |
|  |  | Core material | 0.29 | 0.21 | 0.16 | 1.24 | 1.1 | 0.01 | 0.01 | — | — | — |
| 2 | 0.8 | Brazing material | 11.9 | 0.22 | — | — | — | 0.01 | 0.01 | 0.1 | 0.03 | 8 |
|  |  | Core material | 0.28 | 0.15 | 0.16 | 1.2 | 0.7 | 0.01 | 0.01 | — | — | — |
|  |  | Cladding material | 0.1 | 0.3 | — | — | — | 0.9 | 0.01 | — | — | 10 |

TABLE 2

|  | Test body No. | Horizontal sheet | Vertical sheet |  |  |  |  |  |  |  |  |  | Clearance filling test FL (mm) |
|---|---|---|---|---|---|---|---|---|---|---|---|---|---|
|  |  |  | Material | Groove position |  |  | Groove number |  |  | W1 (mm) | D1 (mm) | W1/D1 | P1 (mm) |  |
|  |  |  |  | 3-1 | 3-2 | 3-3 | 3-1 | 3-2 | 3-3 |  |  |  |  |  |
| Example | S1 | 1 | 3003 | — | ● | ● | — | 30 | 30 | 0.020 | 0.020 | 1.00 | 0.050 | 12 |
|  | S2 | 1 | 3003 | — | ● | ● | — | 30 | 30 | 0.040 | 0.067 | 0.60 | 0.050 | 13 |
|  | S3 | 1 | 3003 | — | ● | ● | — | 30 | 30 | 0.020 | 0.020 | 1.00 | 0.020 | 15 |
|  | S4 | 1 | 3003 | — | ● | — | — | 15 | — | 0.050 | 0.010 | 5.00 | 0.00 | 13 |
|  | S5 | 2 | 3003 | — | ● | ● | — | 15 | 15 | 0.050 | 0.010 | 5.00 | 0.00 | 14 |
|  | S6 | 2 | 3003 | ● | — | — | 6 | — | — | 0.050 | 0.010 | 5.00 | 0.00 | 16 |
|  | S7 | 2 | 3003 | ● | ● | ● | 6 | 15 | 15 | 0.050 | 0.010 | 5.00 | 0.00 | 16 |
| Comparative Example | R1 | 1 | 3003 | — | — | — | — | — | — |  |  |  | — | 8 |
|  | R2 | 2 | 3003 | — | — | — | — | — | — |  |  |  | — | 8 |
|  | R3 | 2 | 3003 | — | ● | ● | — | 30 | 30 | 0.110 | 0.010 | 11.00 | 0.002 | 10 |
|  | R4 | 2 | 3003 | — | ● | ● | — | 5 | 5 | 0.050 | 0.010 | 5.00 | 2.000 | 10 |
|  | R5 | 2 | 3003 | — | ● | ● | — | 1 | 1 | 0.050 | 0.010 | 5.00 | 0.001 | 10 |

●: Representing the position where the grooves are provided

TABLE 3

|  | Test body No. | Horizontal sheet | Vertical sheet |  |  |  |  |  |  |  |  |  |  |  | Clearance filling test FL (mm) |
|---|---|---|---|---|---|---|---|---|---|---|---|---|---|---|---|
|  |  |  | Material | Groove position |  |  | Groove number |  |  | W2 (mm) | D2 (mm) | D3 (mm) | W2/D2 | D2/D3 |  |
|  |  |  |  | 3-1 | 3-2 | 3-3 | 3-1 | 3-2 | 3-3 |  |  |  |  |  |  |
| Invention Example | S8 | 1 | 3003 | — | ● | ● | — | 30 | 30 | 0.020 | 0.018 | 0.020 | 1.11 | 0.90 | 16 |
|  | S9 | 1 | 3003 | — | ● | ● | — | 15 | 15 | 0.050 | 0.045 | 0.050 | 1.11 | 0.90 | 14 |
|  | S10 | 1 | 3003 | ● | — | — | 6 | — | — | 0.050 | 0.045 | 0,050 | 1.11 | 0.90 | 16 |

●: Representing the position where the grooves are provided

As listed in Table 2 and Table 3, it was confirmed that the test materials of Examples, which are the examples of the present invention, allowed excellent joint states at acceptable levels to be attained.

The invention claimed is:

1. A brazed product comprising a brazed aluminum member and a member formed of a brazing sheet brazed with the aluminum member, the brazing sheet comprising:
   a core material formed of an aluminum alloy comprising at least 3.00 mass % or less of Mg and formed with the balance being Al and inevitable impurities; and
   a brazing material formed of an aluminum alloy comprising 3.00 mass % to 13.00 mass % of Si and formed with the balance being Al and inevitable impurities, wherein two or more grooves are provided on a surface of the brazed aluminum member in a fillet forming area wherein fillets are formed by the brazing material of the brazing sheet that is flowed into the grooves,
   a groove depth (D1) of the grooves is 0.005 mm to 0.50 mm,
   a groove width (W1) of the grooves is 0.005 mm to 0.50 mm,
   a ratio (W1/D1) of the groove width (W1) to the groove depth (D1) is 10.00 or less, and
   a space (P1) between adjacent grooves is 0.00 mm to 0.30 mm.

2. The brazed product according to claim 1, wherein the aluminum alloy forming the brazed aluminum member comprises any one or more of 1.50 mass % or less of Si, 1.00 mass % or less of Fe, 1.20 mass % or less of Cu, 2.00 mass % or less of Mn, 3.00 mass % or less of Mg, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 1.00 mass % or less of Bi, 0.05 mass % or less of Na, 0.05 mass % or less of Sr, and 0.05 mass % or less of Sb and is formed with the balance being Al and inevitable impurities.

3. The brazed product according to claim 1, wherein the brazing material of the brazing sheet further comprises any one or more of 1.00 mass % or less of Bi, 1.00 mass % or less of Fe, 1.20 mass % or less of Cu, 2.00 mass % or less of Mn, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 0.05 mass % or less of Na, 0.05 mass % or less of Sr, and 0.05 mass % or less of Sb.

4. The brazed product according to claim 1, wherein the core material of the brazing sheet further comprises any one or more of 1.50 mass % or less of Si, 1.00 mass % or less of Fe, 1.20 mass % or less of Cu, 2.00 mass % or less of Mn, 8.00 mass % or less of Zn, 0.30 mass % or less of Cr, 0.30 mass % or less of Ti, 0.30 mass % or less of Zr, 0.10 mass % or less of In, 0.10 mass % or less of Sn, 1.00 mass % or less of Bi, 0.05 mass % or less of Na, 0.05 mass % or less of Sr, and 0.05 mass % or less of Sb.

* * * * *